US005251477A

United States Patent [19]

Nakashima et al.

[11] Patent Number: 5,251,477

[45] Date of Patent: Oct. 12, 1993

[54] SELF-DIAGNOSIS APPARATUS IN A SYSTEM FOR PREVENTION OF SCATTERING OF FUEL EVAPORATION GAS

[75] Inventors: Akihiro Nakashima, Obu; Shigenori Isomura, Kariya; Satoru Namizaki, Toyohashi; Hidehiko Inoue, Kariya, all of Japan

[73] Assignee: Nippondenso Co., Ltd., Kariya, Japan

[21] Appl. No.: 659,720

[22] Filed: Feb. 25, 1991

[30] Foreign Application Priority Data

| | | | |
|---|---|---|---|
| Feb. 26, 1990 | [JP] | Japan | 2-46925 |
| Feb. 26, 1990 | [JP] | Japan | 2-46926 |
| Feb. 26, 1990 | [JP] | Japan | 2-46927 |
| Feb. 26, 1990 | [JP] | Japan | 2-46928 |
| Jul. 24, 1990 | [JP] | Japan | 2-195474 |

[51] Int. Cl.[5] .......... G01M 19/00

[52] U.S. Cl. .......... 73/118.1

[58] Field of Search .......... 73/117.3, 118.1, 865.9, 73/119 A

[56] References Cited

U.S. PATENT DOCUMENTS

| | | |
|---|---|---|
| 4,646,702 | 3/1987 | Matsubara et al. . |
| 4,741,318 | 5/1988 | Kortge et al. . |
| 4,841,940 | 6/1989 | Uranishi et al. . |
| 4,865,000 | 9/1989 | Yajima . |
| 4,867,126 | 9/1989 | Yonekawa et al. . |

FOREIGN PATENT DOCUMENTS

| | | |
|---|---|---|
| 3516454 | 11/1986 | Fed. Rep. of Germany . |
| 3623894 | 1/1987 | Fed. Rep. of Germany . |
| 57-52663 | 3/1982 | Japan . |
| 57-129247 | 8/1982 | Japan . |
| 58-84360 | 6/1983 | Japan . |
| 59-22066 | 5/1984 | Japan . |
| 62-26361 | 2/1987 | Japan . |
| 63-85237 | 4/1988 | Japan . |
| 2-26754 | 2/1990 | Japan . |

OTHER PUBLICATIONS

Patent Abstracts of Japan, vol. 12, No. 195 (M-705) (3042) Jun. 7, 1988 & JP-A-63 001 753, Jan. 1988 English Abstract only.

*Primary Examiner*—Robert Raevis
*Attorney, Agent, or Firm*—Cushman, Darby & Cushman

[57] ABSTRACT

Disclosed is a self-diagnosis apparatus in a fuel evaporation gas scattering preventing system in an internal combustion engine. The apparatus comprises: a canister communicating with a fuel tank and containing therein an absorption material adapted to absorb a fuel evaporation gas in the fuel tank; a discharge path for making the canister communicate with a suction path of an internal combustion engine; an opening/closing device provided in the discharge path for opening/closing the discharge path; an air-fuel ratio detector for detecting an air-fuel ratio of an air-fuel mixture fed to the internal combustion engine; a gas generation quantity detector for detecting a quantity of generation of fuel evaporation gas within the fuel tank; judgment device for controlling the opening/closing device to close/open the discharge path to thereby judge whether abnormality exists or not on the basis of a change in the air-fuel ratio detected by the air-fuel ratio detector upon closing/opening discharge path, when the gas generation quantity detector detects that gas is being generated within the fuel tank; and a warning device for generating a warning when the judgment device proves existence of abnormality.

7 Claims, 21 Drawing Sheets

SELF-DIAGNOSIS APPARATUS IN A SYSTEM FOR PREVENTION OF SCATTERING OF FUEL EVAPORATION GAS

BACKGROUND OF THE INVENTION

1. Field of the Invention

The present invention generally relates to a system for preventing a fuel evaporation gas from scattering, and particularly relates to a self-diagnosis apparatus in such a fuel evaporation gas scattering preventing system.

2. Description of the Related Art

Conventionally, known is a system for preventing a fuel evaporation gas generated in a fuel tank from scattering into the atmosphere. For example, in the system as disclosed in Japanese Patent Unexamined Publication No. JP-A-57-129247 has a configuration in which a fuel evaporation gas generated in a fuel tank is absorbed by an absorption material in a canister and the thus absorbed fuel evaporation gas is led into a suction manifold, by means of negative pressure in the suction manifold, together with fresh air sucked through an atmosphere opening hole of the canister, in accordance with an engine operating condition.

In such a conventional system, however, there has been such a possibility that if a discharge path connecting the canister and the suction manifold to each other is crushed or blocked for some reasons to thereby be closed, the canister is fulfilled with the fuel evaporation gas and then the fuel evaporation gas is scattered into the atmosphere through the atmosphere opening hole of the canister. Further, there has been such a possibility that if the discharge path to the suction manifold is damaged or the piping of the discharge path comes off for some reasons so that the discharge path is opened to the atmosphere, the fuel evaporation gas is scattered from the canister into the atmosphere. Moreover, if the atmosphere opening hole of the canister is closed for some reasons, there has been such a possibility that the inner pressure in the canister is raised because of the fuel evaporation gas generated in the fuel tank so that the piping comes off, and so that the fuel evaporation gas is scattered into the atmosphere.

SUMMARY OF THE INVENTION

It is therefore an object of the present invention to provide a self-diagnosis apparatus for detecting abnormal supply in which no fuel evaporation gas is led into a suction path.

In order to attain the above object, according to a first aspect of the present invention, as shown in FIG. 1, the self-diagnosis apparatus in a fuel evaporation gas scattering preventing system, comprises: a canister M2 communicating with a fuel tank M1 and containing therein an absorption material adapted to absorb a fuel evaporation gas in the fuel tank M1; a discharge path M4 for making the canister M2 communicate with a suction path M3 of an internal combustion engine; an opening/closing means M5 provided in the discharge path M4 for opening/closing the discharge path M4; an air-fuel ratio detector means M6 for detecting an air-fuel ratio of an air-fuel mixture fed to the internal combustion engine; a gas generating condition detector means M7 for detecting existence of generation of a fuel evaporation gas within the fuel tank M1; a judgment means M8 for controlling the opening/closing means M5 to close/open the discharge path M4 to thereby judge whether abnormality exists or not on the basis of a change in the air-fuel ratio detected by the air-fuel ratio detector means M6 upon closing/opening the discharge path, when generation of a fuel evaporation gas in the fuel tank M1 is detected by the gas generating condition detector means M7; and a warning means M9 for generating a warning when the judgment means M8 proves existence of abnormality.

In the self-diagnosis apparatus according to the first aspect of the present invention, the judgment means M8 controls the opening/closing means M5 to close/open the discharge path M4 to thereby judge whether abnormality exists or not on the basis of a change in the air-fuel ratio detected by the air-fuel ratio detector means M6 upon closing/opening the discharge path, when generation of a fuel evaporation gas in the fuel tank M1 is detected by the gas generating condition detector means M7. That is, for example, when the discharge path M4 is blocked, the judgment means M8 proves existence of abnormality, because the fuel evaporation gas from the absorbing material in the canister M2 is not fed to the suction path M3 of the internal combustion engine and the air-fuel ratio does not vary in response to the opening/closing operation of the opening/closing means M5. When the judgment means M8 proves existence of abnormality, the warning means M9 generates a warning.

According to a second aspect of the present invention, as shown in FIG. 2, the self-diagnosis apparatus in a fuel evaporation gas scattering preventing system, comprises: a canister M12 communicating with a fuel tank M11 and containing therein an absorption material adapted to absorb a fuel evaporation gas in the fuel tank M11; a discharge path M14 for making the canister M12 communicate with a suction path M13 of an internal combustion engine; an opening/closing means M15 provided in the discharge path M14 for opening/closing the discharge path M14; an air-fuel ratio detector means M16 for detecting an air-fuel ratio of an air-fuel mixture fed to the internal combustion engine; a gas generating quantity detector means M17 for detecting a quantity of generation of a fuel evaporation gas within the fuel tank M1; a judgment means 18 for controlling the opening/-closing means 15 to close/open the discharge path M14 to thereby judge whether abnormality exists or not on the basis of a change in the air-fuel ratio detected by the air-fuel ratio detector means M16 upon closing/opening the discharge path, when an accumulated evaporation quantity of the fuel evaporation gas fed to the canister M12 from the fuel tank M1 and detected by the gas generating quantity detector means M17 becomes not smaller than a predetermined value in the condition that the discharge path M14 is closed; and a warning means M19 for generating a warning when the judgment means M18 proves existence of abnormality.

In the self-diagnosis apparatus according to the second aspect of the present invention, the judgment means M18 controls the opening/closing means M15 to close/open the discharge path M14 to thereby judge whether abnormality exists or not on the basis of a change in the air-fuel ratio detected by the air-fuel ratio detector means M16 upon closing/opening the discharge path, when an accumulated evaporation quantity of the fuel evaporation gas fed to the canister M12 from the fuel tank M1 and detected by the gas generating quantity detector means M17 becomes not smaller than a predetermined value in the condition that the discharge path M14 is closed. That is, the abnormality detection on the basis of a change in air-fuel ratio is carried out after a fuel evaporation gas of a predetermined accumulated evaporation value or more is absorbed by a predetermined value or more in the absorption material of the canister M12, so that the detection operation becomes made surer. The warning means M19 generates a warning when the judgment means M18 proves existence of abnormality.

According to a third aspect of the present invention, as shown in FIG. 10, the self-diagnosis apparatus in a fuel evaporation gas scattering preventing system comprises: a canister M22 communicating with a fuel tank M21 through a communication path M20 and containing therein an absorption material adapted to absorb a fuel evaporation gas in the fuel tank M21; a first opening/closing means M25 provided in the communication path M20 for opening/closing the communication path M20; a second opining/closing means M27 provided in a discharge path M24 for opening/closing the discharge path M24, the discharge path M24 making the canister M22 communicate with a suction path M23 of an internal combustion engine; an air-fuel ratio detector means M26 for detecting an air-fuel ratio of an air-fuel mixture fed to the internal combustion engine; a judgement means M28 for controlling the second opening/-closing means M27 to open/close the discharge path M24 to thereby make a judgment as to whether abnormality exists or not on the basis of a change in the air-fuel ratio detected by the air-fuel ratio detector means M26 in a condition that the judgment means M28 controls the first opening/closing means M25 to close the communication path M20; and a warning means M29 for generating a warning when the judgment means M28 proves existence of abnormality.

In the self-diagnosis apparatus according to the third aspect of the present invention, the judgment mean M28 controls the second opening/closing means M27 to open/close the discharge path M24 to thereby make a judgment as to whether abnormality exists or not on the basis of a change in the air-fuel ratio detected by the air-fuel ratio detector means M26 in a condition that the judgment means M28 controls the first opening/closing means M25 to close the communication path M20. The warning means M29 generates a warning when the judgment means M28 proves existence of abnormality.

According to a fourth aspect of the present invention, as shown in FIG. 14, the self-diagnosis apparatus in a fuel evaporation gas scattering preventing system comprises: a canister M32 communicating with a fuel tank M31 and containing therein an absorption material adapted to absorb a fuel evaporation gas in the fuel tank M31; a discharge path M34 for making the canister M32 communicate with a suction path M33 of an internal combustion engine; an opening/closing means M35 provided in the discharge path M34 for opening/closing the discharge path M34; an air-fuel ratio detector means M36 for detecting an air-fuel ratio of an air-fuel mixture fed to the internal combustion engine; an operation load condition detector means M37 for detecting an operation load condition of the internal combustion engine; a first judgment means M38 for controlling the opening/-closing means M35 to open/close the discharge path M34 to thereby make a judgment as to whether abnormality exists or not on the basis of a change in the air-fuel ratio detected by the air-fuel ratio detector means M36 when the operation load condition detector means M37 detects that the internal combustion engine becomes in a first operation load condition; a second judgment means M39 for controlling the opening/closing means M35 to open/close the discharge path M34 to thereby make a judgment as to whether abnormality exists or not on the basis of a change in the air-fuel ratio detected by the air-fuel ratio detector means M36 when the operation load condition detector means M37 detects that the internal combustion engine becomes in a second operation load condition lower than the first operation load condition after the first judgment means M38 proves existence of abnormality; and a warning means M40 for generating a warning when the second judgment means M39 proves existence of abnormality.

The first judgment means M38 controls the opening/-closing means M35 to open/close the discharge path M34 to thereby make a judgment as to whether abnormality exists or not on the basis of a change in the air-fuel ratio detected by the air-fuel ratio detector means M36 when the operation load condition detector means M37 detects that the internal combustion engine is in a first operation load condition which is a high operation load condition. At this time, although a bad influence onto the operation property of the internal combustion engine is little, the detection accuracy is low.

The second judgment means M39 controls the opening/closing means M35 to open/close the discharge path M34 to thereby make a judgment as to whether abnormality exists or not on the basis of a change in the air-fuel ratio detected by the air-fuel ratio detector means M36 when the operation load condition detector means M37 detects that the internal combustion engine is in a second operation load condition lower than the first operation load condition after the first judgment means M38 proves existence of abnormality. That is, existence of abnormality is judged in the second operation load condition in which the detection accuracy is high. Thereafter, the warning means M40 generates a warning when the second judgment means M39 proves existence of abnormality.

As described above in detail, the present invention shows such an excellent effect that the abnormal supply in which no fuel gas is led into a suction path can be detected.

DESCRIPTION OF THE PREFERRED EMBODIMENTS

First Embodiment

An embodiment of the present invention will be described with reference to the accompanying drawings hereunder.

Figure 1:
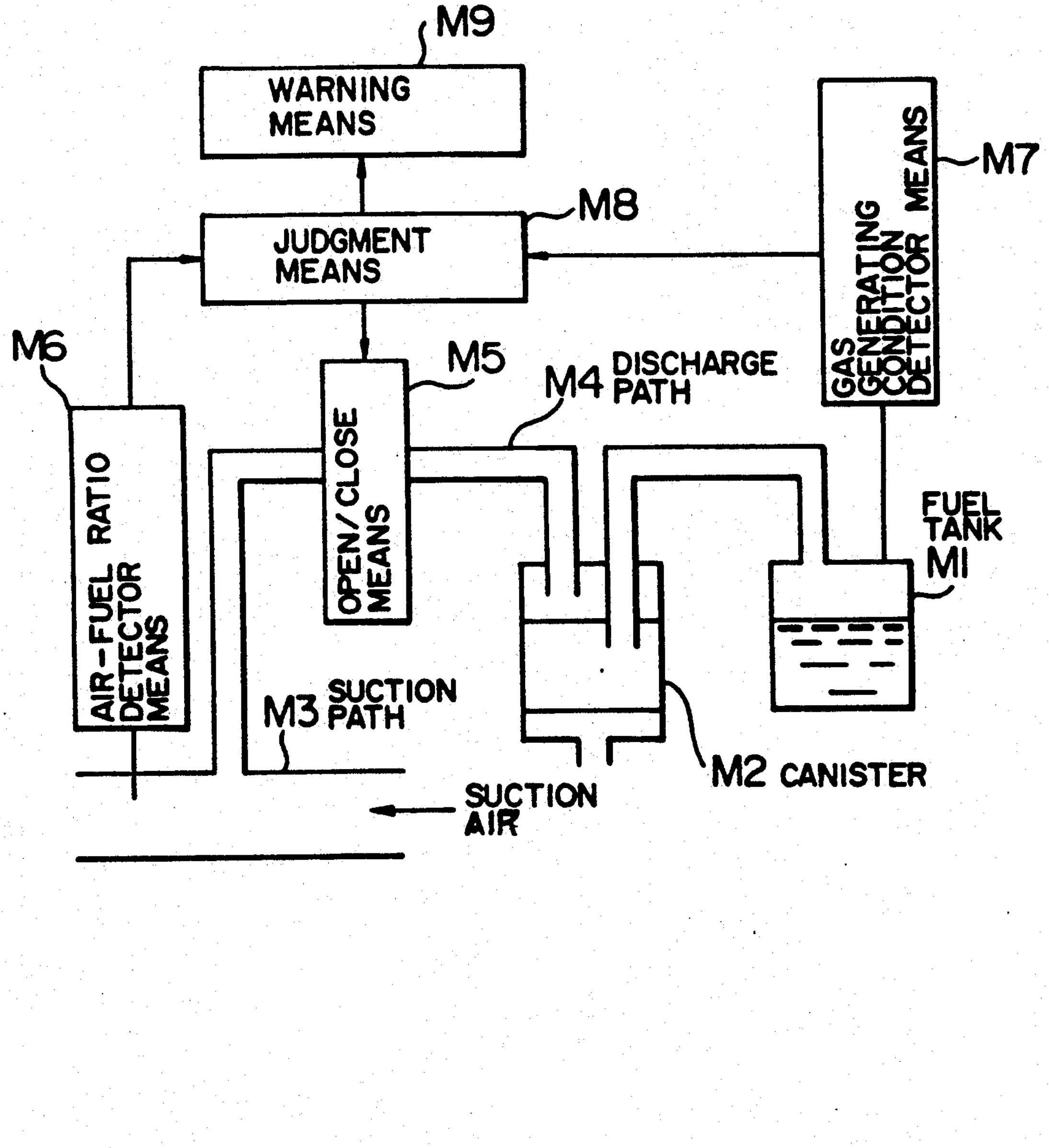
FIG. 1 is a diagram corresponding to the claim according to the first aspect of the present invention.
Figure 2:
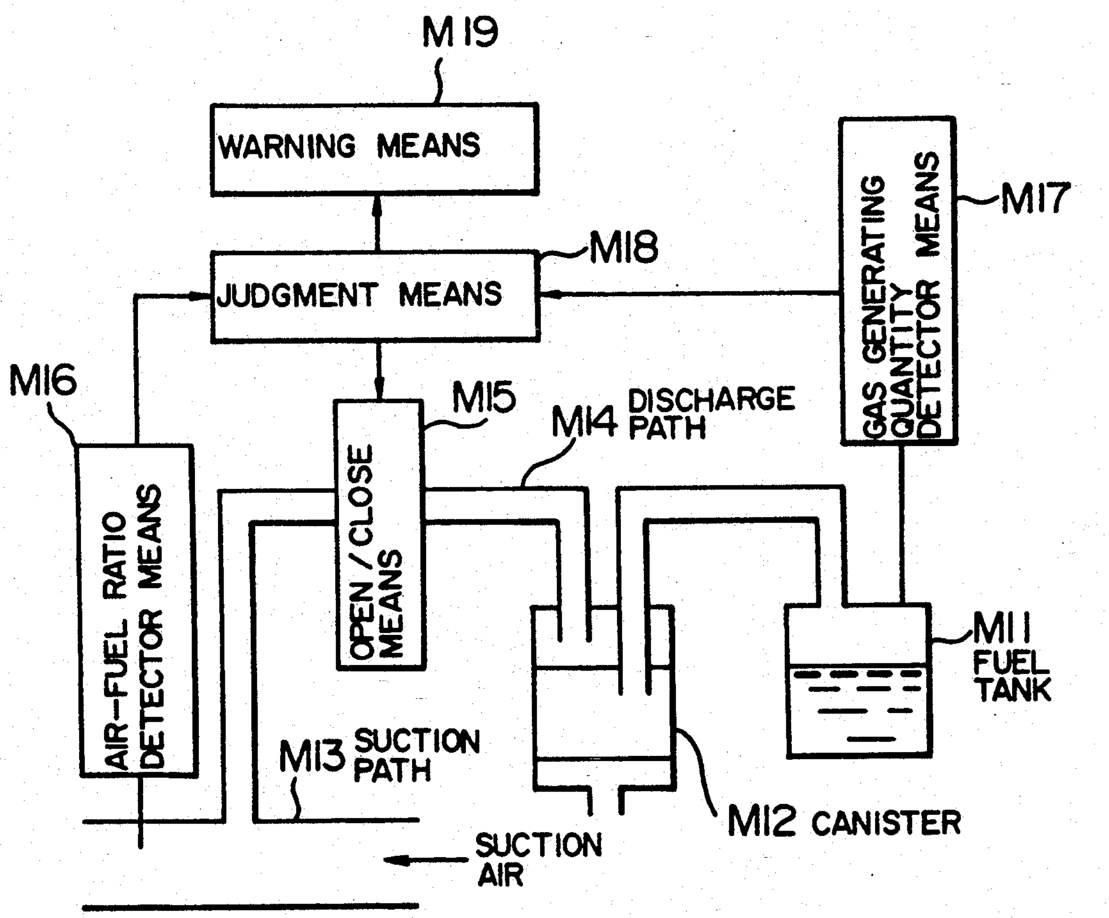
FIG. 2 is a diagram corresponding to the claim according to the second aspect of the present invention.
Figure 3:
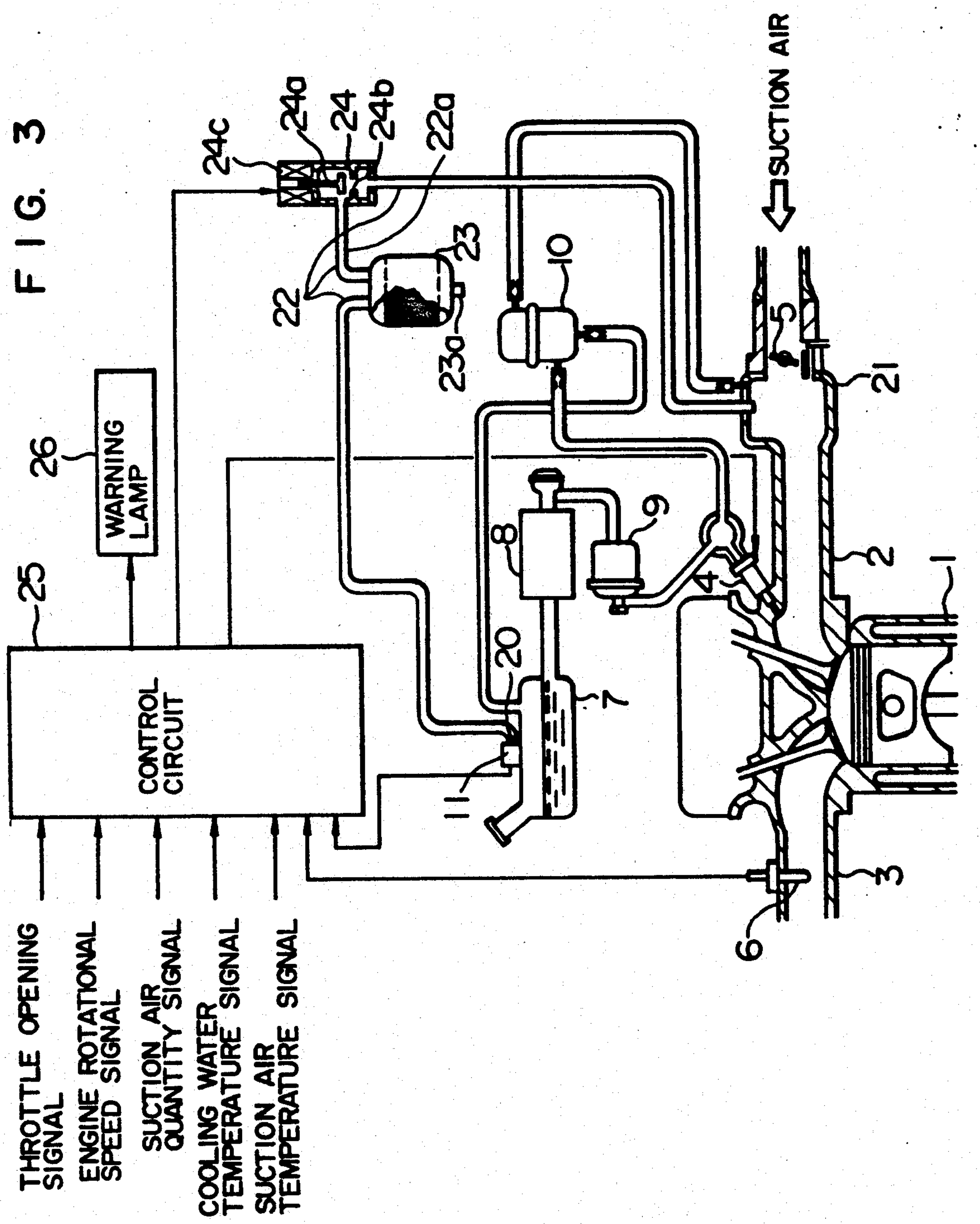
FIG. 3 is a diagram showing the vicinity of an engine in a first embodiment.

A multi-cylinder engine 1 of FIG. 3 acting as an internal combustion engine is mounted on a vehicle, and connected to a suction manifold (suction path) 2 and an exhaust manifold 3. An electromagnetic fuel injection valve 4 is provided in each of cylinder air suction portions of the suction manifold 2, and a throttle valve 5 is provided in the suction manifold 2. An $O_2$ sensor 6 acting as an air-fuel ratio detection means is provided in the exhaust manifold 3 so as to produce a voltage signal in accordance with the oxygen concentration in an exhaust gas.

A fuel supply system for supplying fuel to the fuel injection valves 4 has a configuration in which fuel in a fuel tank 7 is pressure-sent to each of the injection valves 4 by a fuel pump 8 through a fuel filter 9 and the pressure of the fuel to be supplied to each injection valve 4 is adjusted by a pressure adjustment valve 10 to be a predetermined value.

Figure 4:
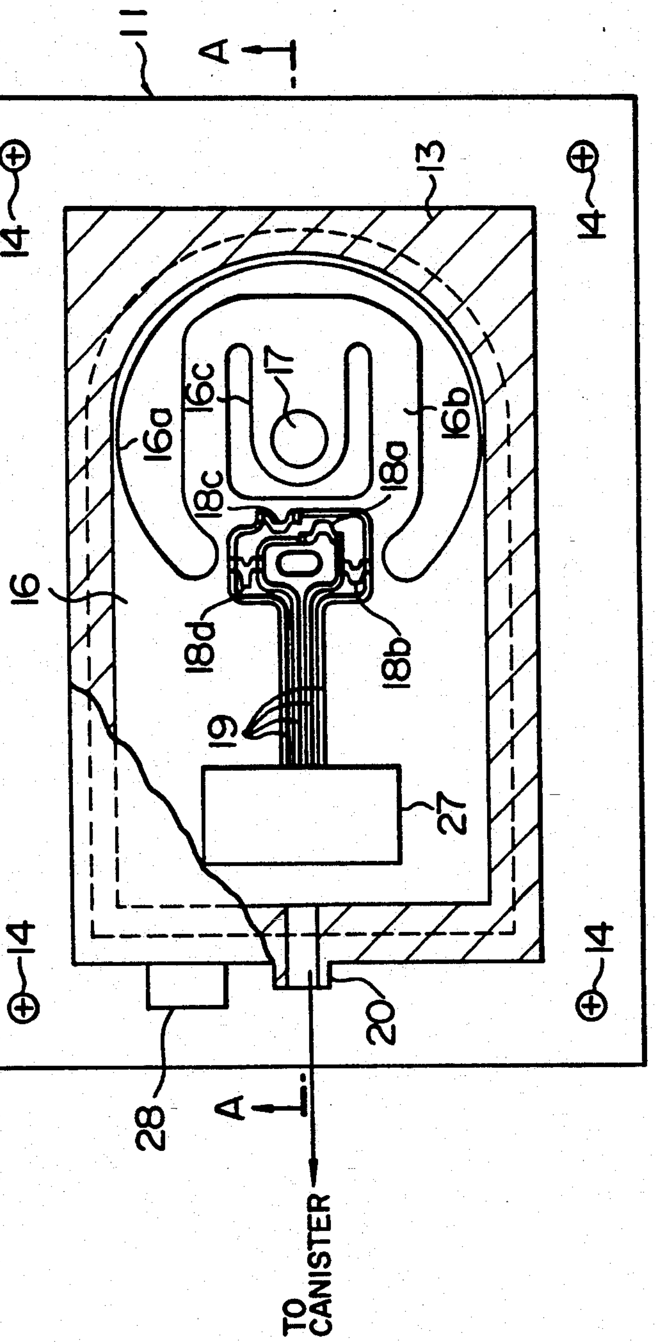
FIG. 4 is a plan showing a gas flow rate sensor.
Figure 5:
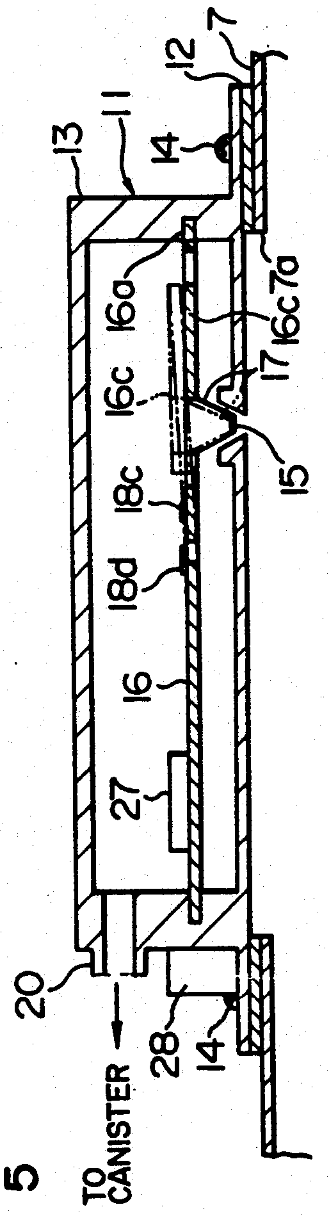
FIG. 5 is a section taken on line A—A of FIG. 4.

A gas flow-rate sensor 11 acting as a gas generating condition detector means is provided in the fuel tank 7. FIG. 4 and FIG. 5 which is section taken on line A—A of FIG. 4 show the gas flow-rate sensor 11. An opening portion 7*a* is formed through the ceiling surface of the fuel tank 7, and a casing 13 of the gas flow-rate sensor 11 is fixed in the opening portion 7*a* by machine screws 14 through a gasket 12. The casing 13 is formed into a box shape, and a communication hole 15 is formed through the bottom surface of the casing 13 so as to communicate with the fuel tank 7.

A flexible support plate 16 is provided in the casing 13. The support plate 16 has a ring portion 16*a* fixed in the casing 13, a gauge portion 16*b* provided so as to extend to the inside of the ring portion 16*a*, and a valve body support portion 16*c* extending from the gauge portion 16*b*. A conical valve body 17 is fixed on the valve body support portion 16*c* so as to close the communication hole 15. Four strain gauges 18*a*–18*d* are disposed on the gauge portion 16*b* of the support plate 16 so as to constitute a Wheatstone bridge the output of which is led out through a processing portion 27 provided on the upper surface of the support plate 16 and through a connector 28 provided on the side surface of the casing 13. Further, a connecting portion 20 is provided in the casing 13 so as to make connection with a canister 23 which will be described later.

When a fuel evaporation gas is generated in the fuel tank 7, a force acts on the valve body 17 so as to move upward so that the valve body support portion 16*c* is brought into an upper position and the support portion 16 is partially bent, as shown by a one-dot chained line in FIG. 5. This deformation is detected by the strain gauges 18*a*–18*d*, and the quantity of electricity corresponding to the quantity of generation of the fuel evaporation gas is taken out through the processing portion 27.

In FIG. 3, the connecting portion 20 of the gas flow-rate sensor 11 is communicated with a surge tank 21 of the suction system through a purge pipe 22, and a canister 23 in which activated carbon acting as an absorption material is contained is disposed in a midway of the purge pipe 22 so that a fuel evaporation gas is absorbed by the activated carbon in the canister 23. Further, an atmosphere opening hole 23*a* for sucking fresh air is provided through the canister 23. A portion of the purge pipe 22 from the canister 23 to the surge tank 21 is made to be a discharge path 22*a*, and a solenoid valve for purging (hereinafter, referred to as a purge valve) 24 acting as an opening/closing means is provided halfway across the discharge path 22*a*.

In the purge valve 24, although a valve body 24*a* is normally urged by a spring (not shown) in the direction to open a seat portion 24*b*, if a coil 24*c* is excited the valve body 24*a* closes the seat portion 24*b*. Therefore, the discharge path 22*a* is opened upon unexcitation of the purge valve 24 and closed upon excitation of the purge valve 24.

A control circuit 25 including a microcomputer and acting as a judgment means receives a throttle opening signal produced from a throttle sensor (not shown) which detects the opening of the throttle valve 5, an engine rotational speed signal produced from a rotational speed sensor (not shown) which detects the rotational speed of the engine 1, a suction air quantity signal produced from a suction air quantity sensor (not shown) which detects the quantity of suction air, a cooling water temperature signal produced from a water temperature sensor (not shown) which detects the temperature of engine cooling water, and a suction air temperature signal produced from a water, and temperature sensor (not shown) which detects the temperature of suction air. Thus, the control circuit 25 detects from the signals, the opening of the throttle valve 5, the rotational speed of the engine 1, the quantity of suction air, the temperature of engine cooling water, and the temperature of suction air.

Figure 7:
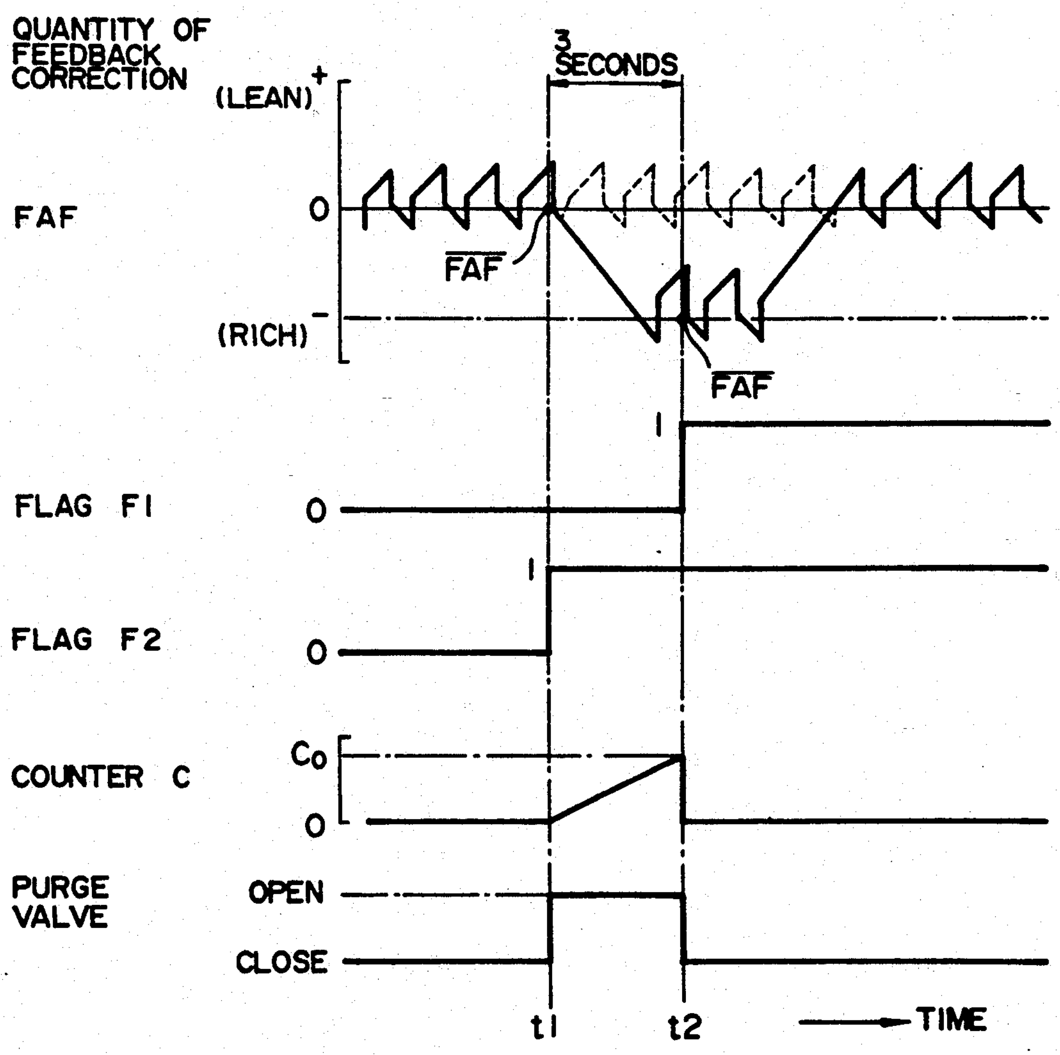
FIG. 7 is a time-chart showing various processing to be executed in the self-diagnoses operation of the first embodiment.

The control circuit 25 further receives a signal produced from the $O_2$ sensor 6 so as to judge whether air-fuel mixture is rich or lean. Then, the control circuit 25 makes a feedback correction factor FAF stepwise change or skip as shown in FIG. 7 so as to increase or decrease or decrease the quantity of fuel injection when the condition of air-fuel mixture is inverted from rich one into lean one or from lean one into rich one, respectively, while the control circuit 25 makes the feedback correction factor FAF increase or decrease gradually when the air-fuel mixture is rich or lean. However, the control circuit 25 does not execute the feedback control when the temperature of engine cooling water is low or when the engine is being driven with a high load or at a high speed. Further, the control circuit 25 obtains a fundamental injection time on the basis of the rotational speed of the engine 1 and the quantity of suction air, and corrects the fundamental injection time by using the feedback correction factor FAF and the like to thereby obtain a final injection time so that fuel injection is performed by the fuel injection valve 4 at a predetermined injection timing.

The control circuit 25 further receives a signal from the gas flow-rate sensor 11. The control circuit 25 is connected further to the purge valve 24 so as to control the opening of the purge valve 24. A warning lamp 26 acting as a warning means is provided on an instrument panel of the vehicle, and connected to the control circuit 25.

Next, the operation of the control circuit 25 having such a configuration will be described.

Figure 6:
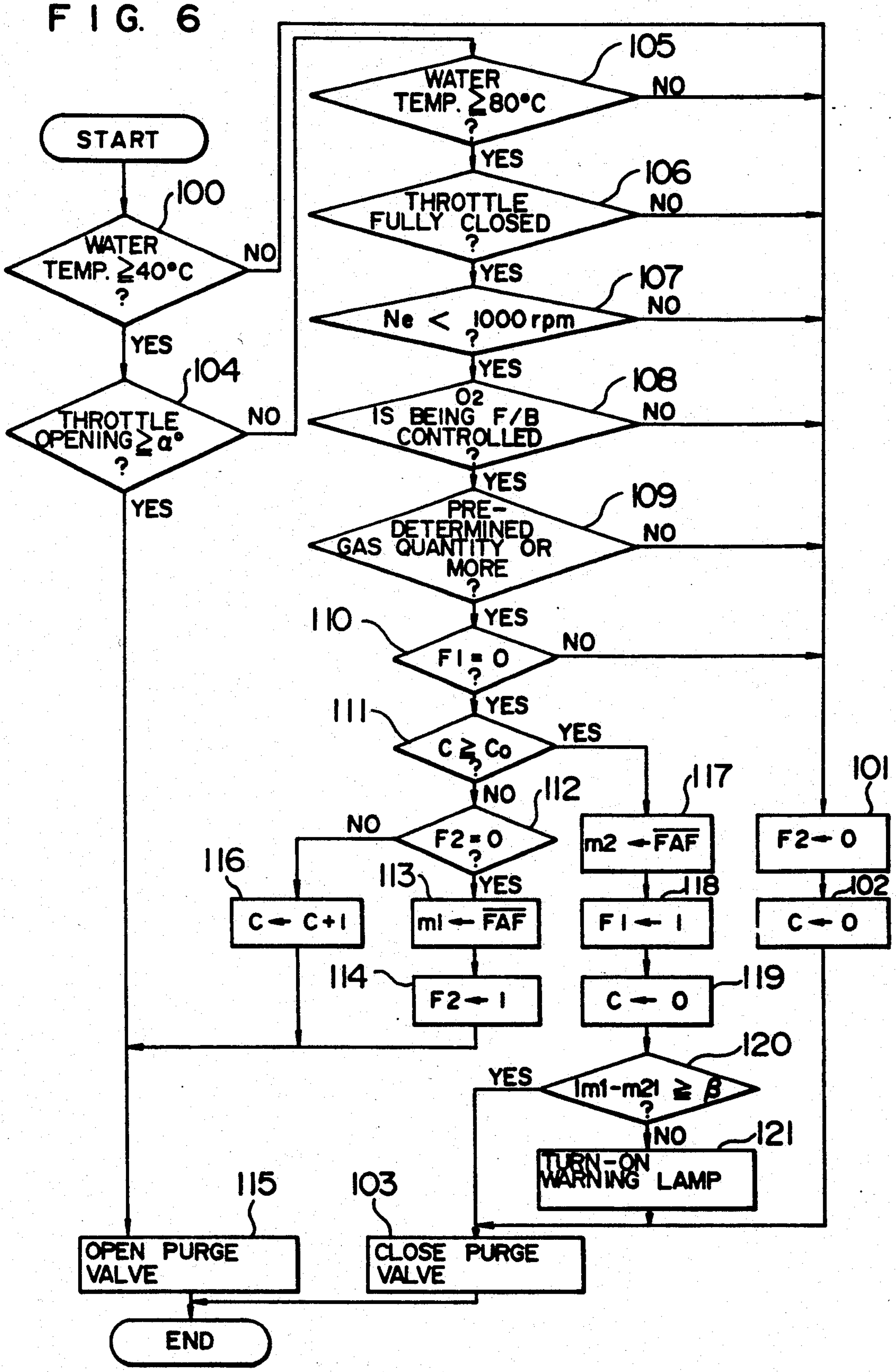
FIG. 6 is a flowchart for explaining the operation of the first embodiment.

FIG. 6 shows routine for controlling the purge valve 24 to be executed every predetermined time, and FIG. 7 shows the operational timing of flags F1 and F2 and a counter C to be used for execution of a control routine on the purge valve 24. The counter C counts a period of time when the purge valve 24 is opened so as to execute self-diagnosis. The flag F1 is a flag which is set to "1" after the first-time judgment of abnormality after the engine starts, while the flag F2 is a check flag for making checking as to whether the abnormality is being judged or not.

First, the control circuit 25 judges whether the temperature of engine cooling water is not lower than 40° C. or not in the step 100. If the judgment proves that the temperature is lower than 40° C., the control circuit 25 sets the flag F2 to "0" in the step 101, and sets the counter C to "0" in the step 102. Then the control circuit 25 closes the purge valve 24 in the step 103.

If the judgment proves that the temperature of engine cooling water is not lower than 40° C., on the contrary, the control circuit 25 judges whether the opening of the throttle valve 5 is not smaller than a predetermined value or not in the step 104. If the judgment proves that the opening is smaller than the predetermined value, judgments are made as to whether various judgment conditions have been established or not in the steps 105–109. If the judgments prove that the judgment conditions have been established, the operation is shifted to the step 110. That is, a judgment is made as to whether the temperature of engine cooling water is not lower than 80° C. or not in the step 105, a judgment is made as to whether the throttle valve 5 is fully closed or not in the step 106, the rotational speed of the engine 1 is not higher than 1000 rpm or not in the step 107, a judgment is made as to whether an air-fuel ratio detected by the $O_2$ sensor 6 is being feedback-controlled or not in the step 108, and a judgment is made as to whether the quantity of generation of fuel evaporation gas detected by the gas flow-rate sensor 11 is not smaller than a predetermined value or not in the step 109.

If the judgments prove that all the judgment conditions have been established, the control circuit 25 confirms that the flag F1 which should be set to "0" upon starting the engine is "0" in the step 110, and judges whether the counter C has reached a predetermined count value $C_0$ or not in the step 111. The control circuit 25 judges whether the flag F2 is "0" or not in the step 112 because in the initial time the count value of the counter C is "0" which has been set in the step 102. Since the flag F2 has been set to "0" in the step 101, the control circuit 25 records the feedback correction factor $\overline{FAF}$ at that time in a storage area $\underline{m_1}$.

The feedback correction factor $\overline{FAF}$ is renewed through the following calculation which is executed every predetermined time.

$$FAF = \frac{63FAF + FAF}{64}$$

Then, the control circuit 25 sets the flag F2 to "1" in the step 114, and opens the purge valve 24 (at a timing $t_1$ in FIG. 7) in the step 115. As a result, a fuel evaporation gas in the fuel tank 7 is absorbed by the activated carbon in the canister 23, and the absorbed fuel evaporation gas is led into the suction manifold 2, by means of the negative pressure in the suction manifold 2, together with fresh air sucked from the atmosphere opening hole 23a of the canister 23.

In the next routine, the control circuit 25 increases the count value of the counter C by "1" in the step 116 because the flag F2=1 has been set in the step 112.

Then, if the judgment proves that the count value of the counter C has reached the predetermined count value $C_0$ in the step 111, the control circuit 25 records the feedback correction factor FAF at this time in a storage area $m_2$ in the step 117. By the processing in the step 117, the feedback correction factor FAF when the count value of the counter C has reached $C_0$ after opening of the purge valve 24 (after three seconds) is stored as shown in FIG. 7. Next, the control circuit 25 sets the flag F1 to "1" in the step 118, and sets the count value of the counter C to "0" in the step 119.

Further, the control circuit 25 obtains the absolute value of a difference ($=m_1-m_2$) between the $\overline{FAF}$s obtained in the steps 113 and 117 in the step 120, and makes a judgment in the step 120 as to whether the difference is not smaller than a predetermined value 8 or not. If the judgment proves that the difference is smaller than the predetermined value $\beta$, the control circuit 25 concludes that the condition is abnormal and turns on the warning lamp 26 to thereby inform a rider of the abnormality. That is, if the system functions normally, a fuel evaporation gas absorbed by the activated carbon in the canister 23 is supplied into the suction manifold 2 when the purge valve 24 is opened from its closed state, and the air-fuel ratio becomes rich, so that the judgment in the step 120 proves that the difference between the $\overline{FAF}$s becomes not smaller than the predetermined value $\beta$. If the judgment in the step 120 proves that the difference between the $\overline{FAF}$s is smaller than the predetermined value $\beta$, on the contrary, it is concluded that abnormally such as blocking or the like is caused in the purge pipe 22.

As described above, in the self-diagnosis apparatus according to this embodiment, when generation of a fuel evaporation gas in the fuel tank 7 is detected by the gas flowrate sensor 11 (the gas generating condition detector means), the control circuit 25 (the judgment means) controls the purge valve 24 (the opening/closing means) so as to close/open the discharge path 22a. By the operation of opening the purge valve 24, the fuel evaporation gas in the fuel tank 7 is absorbed by the activated carbon, and the absorbed fuel evaporation gas is led into the suction manifold 2. By the operations of opening/closing the purge valve 24, existence of abnormality is judged on the basis of the fact that a difference between the air-fuel ratios (the feedback correction factors $\overline{FAF}$) detected by the $O_2$ sensor 6 (the air-fuel ratio detector means) at that time is not smaller than the predetermined value ($\beta$) or not. If the judgment proves existence of abnormality, the warning lamp 26 (warning means) is turned on to thereby give a warning.

If the discharge path 22a is closed or damaged or if the piping of the discharge path comes off for some reasons, therefore, the abnormality is accurately detected so that a fuel evaporation gas can be prevented from being scattered from the canister 23 into the atmosphere. Further, if the atmosphere opening hole 23a of the canister 23 is closed and the piping of the canister comes off, the existence of abnormality can be detected. Thus, it is possible to detect such abnormal supply in which no fuel evaporation gas is led into the suction manifold 2.

As an example of application of this embodiment, a pressure sensor may be used in place of the gas flow-rate sensor 11 (the gas generating condition detector means) so as to detect the fact that a fuel evaporation gas is generated or not in the fuel tank.

Second Embodiment

Next, a second embodiment of the present invention will be described. Although the configuration of the self-diagnosis apparatus according to this second embodiment is the same as that of the embodiment in FIGS. 3 through 5, the operation of a control circuit 25 of this second embodiment is different from that of the control circuit 25 of the first embodiment.

The operation of the control circuit 25 will be described hereunder.

Figure 8:
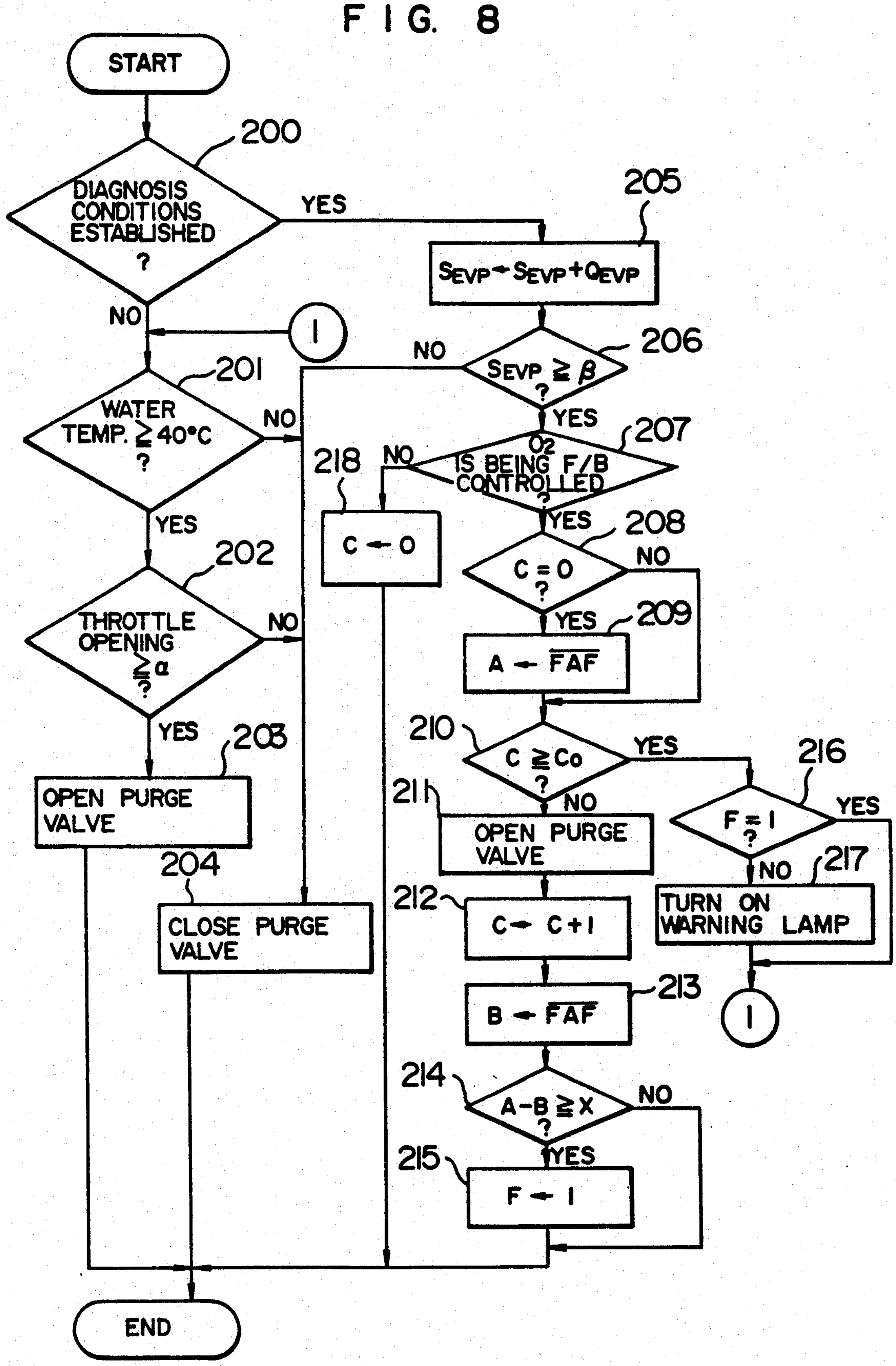
FIG. 8 is a flowchart for explaining the operation of a second embodiment.
Figure 9:
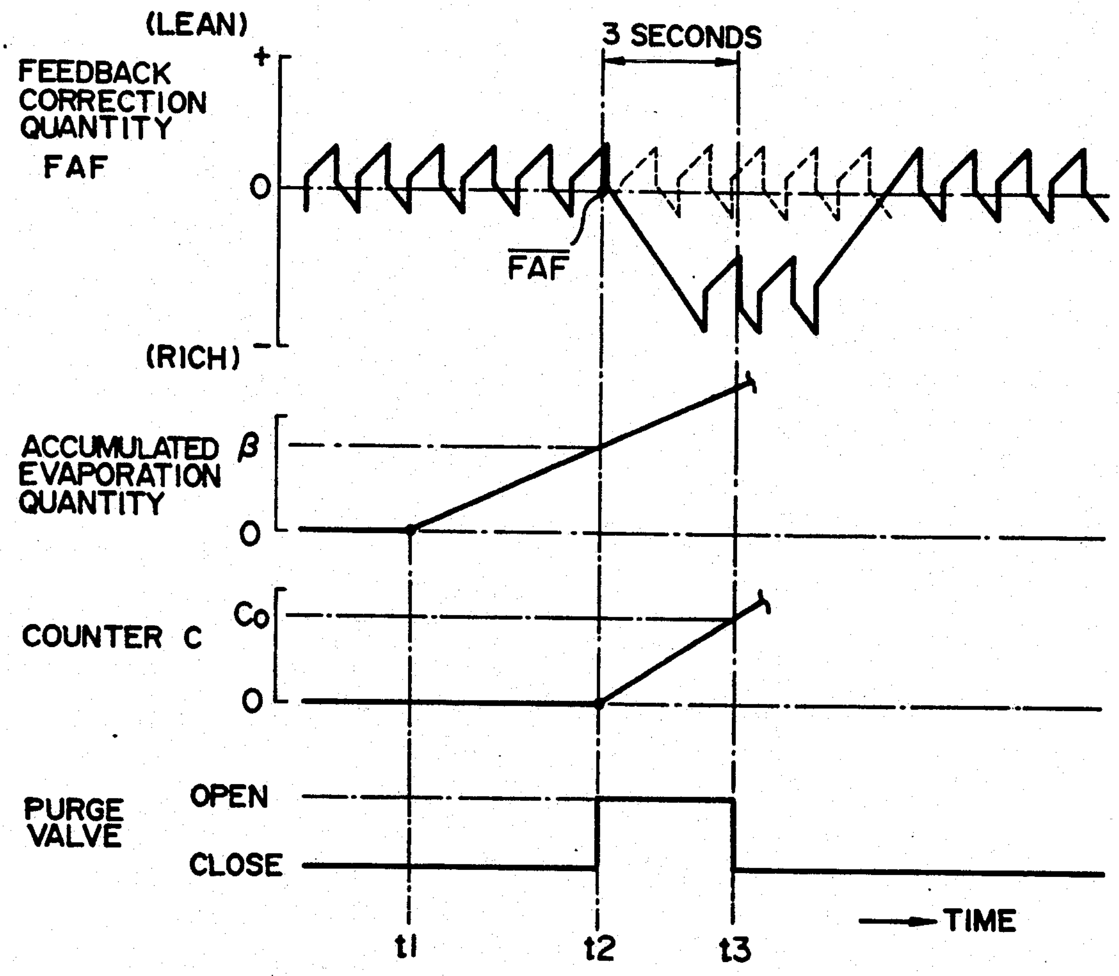
FIG. 9 is a time-chart showing various processing to be executed in the self-diagnosis operation of the second embodiment.
Figure 10:
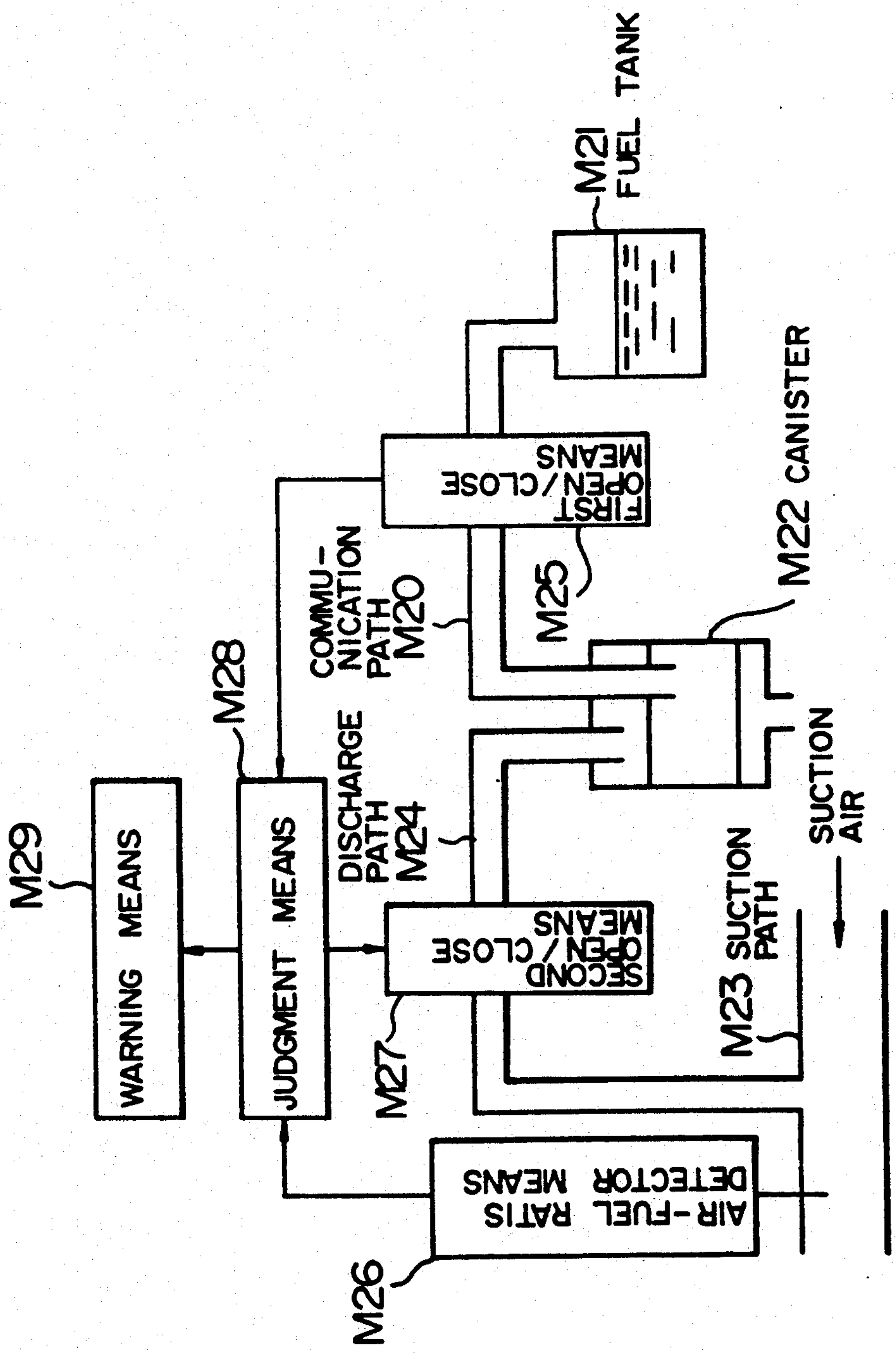
FIG. 10 is a diagram corresponding to the claim according to the third aspect of the present invention.

FIG. 8 shows a control routine which is executed on a purge valve 24 every predetermined time FIG. 9 shows the operational timing of a counter C to be used in the routine for controlling the purge valve 24 and shows the accumulated evaporation quantity $S_{EVP}$ of a fuel evaporation gas from a fuel tank 7. The counter C counts a period of time when the purge valve 24 is opened so as to perform self-diagnosis.

First, when an ignition switch is turned-on, the control circuit 25 sets the accumulated evaporation quantity $S_{EVP}$ to "0", sets the count value of the counter C to "0", and sets a flag F described later to "0". Then, the control circuit 25 judges whether the diagnostic condition is established or not in the step 200. The establishment of the diagnostic condition means the case where the temperature of engine cooling water is not lower than 80° C. and self-diagnosis has never been executed after turning-on of the ignition switch.

If the judgment proves that the temperature of the engine cooling water is lower than 80° C. in the step 200, the control circuit 25 judges whether the temperature of the engine cooling water is not lower than 40° C. or not in the step 201. If the judgment proves that the temperature of the engine cooling water is not lower than 40° C. in the step 201, the control circuit 25 judges whether the opening of a throttle valve 5 is not smaller than a predetermined value o or not in the step 202. If the judgment proves that the opening is not smaller than the predetermined value $\alpha$, the control circuit 25 opens the purge valve 24 in the step 203. If the judgment proves that the temperature of the engine cooling water is lower than 40° C. in the step 201 or the judgment proves that the opening of the throttle valve 5 is smaller than the predetermined value $\alpha$ in the step 202, the control circuit 25 closes the purge valve 24 in the step 204.

If the judgment proves that the temperature of the engine cooling water becomes or exceeds 80° C. for the first time after turning-on of the ignition switch, that is, the diagnostic condition is established (at the timing $t_1$ in FIG. 9) in the step 200, on the contrary, the control circuit 25 adds the quantity of fuel evaporation gas $Q_{EVP}$ obtained by a gas flow-rate sensor 11 at that time and the accumulated evaporation quantity SEVP till that time to each other, and makes the sum be a new accumulated evaporation quantity $S_{EVP}$ in the step 205. The control circuit 25 judges whether the accumulated evaporation quantity $S_{EVP}$ has reached a predetermined value $\beta$ or not in the step 206, and if the judgment proves that the accumulated evaporation quantity $S_{EVP}$ has not reached the predetermined value $\beta$, the control circuit 25 closes the purge valve 24 in the step 204.

A fuel evaporation gas from the fuel tank 7 is absorbed by activated carbon in a canister 23 in the condition where the purge valve 24 is in its closed state by repetition of the processing of the steps 200, 205, 206, and 204.

It the judgment proves that the accumulated evaporation quantity $S_{EVP}$ has reached the predetermined value $\beta$ (at the timing $t_2$ in FIG. 9) in the step 206, on the contrary, the control circuit 25 judges whether the air-fuel ratio detected by an oxygen sensor 6 is being feedback-controlled or not in the step 207. If the judgment proves that the air-fuel ratio feedback-control is being performed, the control circuit 25 judges whether the count value of the counter C is set to "0" or not in the step 208. Since C=0 has been set by initialization in the step 208, the control circuit 25 records the feedback correction factor $\overline{FAF}$ at this time in the storage area A.

Here, the feedback correction factor $\overline{FAF}$ is renewed through the following calculation which is executed every predetermined time.

$$\overline{FAF} = \frac{63\overline{FAF} + FAF}{64}$$

When, the control circuit 25 judges whether the count value of the counter C has reached a predetermined value $C_0$ or not in the step 210, and if the judgment proves that the count value has not reached the predetermined value $C_0$, the control circuit 25 opens the purge valve 24 in the step 211, increased the count value of the counter C by "1" in the step 212, and records the feedback correction factor $\overline{FAF}$ at this time in a storage area B in the step 213. Then, in the step 214 the control circuit 25 obtains a difference (=A-B) between the $\overline{FAF}$s which has been obtained in the steps 209 and 213, and judges whether the difference is not smaller than a predetermined value X or not. If the judgment proves that the difference is not smaller than the predetermined value X, the control circuit 25 sets a flag F into "1". If the judgment proves that the difference between the $\overline{FAF}$s is smaller than the predetermined value X in the step 214, on the contrary, the control circuit 25 does not perform the processing of the step 215 so as to leave the flag F=0 as it is.

The processing of the steps 200, 205, 206, 207, 208, 210, 211, 212, 213, and 214 (and 215) is repeated till the count value of the counter C has reached the predetermined value $C_0$ (for three seconds, that is, for the time between $t_2$ - $t_3$ in FIG. 9), and if the judgment proves that the difference (=A-B) between the $\overline{FAF}$s has reached or exceeded the predetermined value X even once in the step 214, the flag F is set to "1" in the step 215.

If the judgment proves that the count value of the counter C has reached the predetermined value $C_0$ (at the timing $t_3$ in FIG. 9) in the step 210, it is concluded that a predetermined quantity of fuel evaporation gas from the fuel tank 7 is absorbed by the activated carbon in the canister 23. The control circuit 25 judges whether the flag F is "1" or not in the step 216, and if the judgment proves that F=0, the control circuit 25 concludes that there exists abnormality, and turns on a warning lamp 26 to thereby inform a rider of the abnormality. That is, in the case where the system functions normally, if the purge valve 24 is opened after a predetermined quantity of fuel evaporation gas has been absorbed by the activated carbon in the canister 23 in the condition where the purge valve 24 is in its closed condition, the fuel evaporation gas absorbed by the activated carbon is supplied into a suction manifold 2, so that the air-fuel ratio becomes rich, and the difference between the $\overline{FAF}$s becomes larger than the predetermined value $\beta$ in the period while the purge valve 24 is in its opened state in the step 214. If the difference between the $\overline{FAF}$s has never exceeded the predetermined value $\beta$ in the period while the purge valve 24 is in the opened state, it is concluded that there exists abnormality such as blocking or the like in a purge pipe 22. Then, the control circuit 25 turns on the warning lamp 26 in the step 217, and the operation is returned to the step 201.

If the judgment in the step 207 proves that the air-fuel ratio feedback control by means of the $O_2$ sensor 6 is not performed while self-diagnosis is being performed, the control circuit 25 sets the count value of the counter C to "0" in the step 218 so as to perform the self-diagnosis operation again.

As described above, in this embodiment, the quantity of generation of fuel evaporation gas in the fuel tank 7 is detected by the gas flow-rate sensor 11 (the gas generation quantity detector means), so that when the accumulated evaporation quantity $S_{EVP}$ of the fuel evaporation gas sent from the fuel tank 7 to the canister 23 detected by the gas flow-rate sensor 11 reaches or exceeds the predetermined value $\beta$ in the condition where the control circuit 25 (the judgment means) controls the purge valve 24 (the opening/closing means) to make the discharge path 22a be in its closed state, the control circuit 25 controls the purge valve 24 to successively open and close the discharge path 22a to thereby judge whether abnormality exists or not on the basis of the fact that a difference between the air-fuel ratios (feedback correction factors $\overline{FAF}$) detected by the $O_2$ sensor 6 (the air-fuel ratio detector means) at that time is not smaller than the predetermined value X or not. If it is concluded that there exists abnormality, the warning lamp 26 (the warning means) is turned on to thereby produce a warning.

Similarly to the first embodiment, therefore, it is possible to detect such abnormality that the discharge path 22a is closed or damaged or that the piping therefor comes off for some reasons as well as such abnormality that the atmosphere opening hole 23a of the canister 23 is closed or the piping therefore comes off, and therefore it is possible to detect such abnormal supply in which no fuel evaporation gas is led into the suction manifold 2. Further abnormality is detected on the basis of a change of the air-fuel ratio after a fuel evaporation gas of a predetermined accumulated evaporation value or more has been absorbed by the activated carbon in the canister 23, and therefore the detecting operation of this embodiment becomes more accurate.

Further, as an example of application of this embodiment, a gas flow-rate switch configured so as to be turned-on when the quantity of fuel evaporation gas has reached or exceeded a predetermined value may be used in place of the gas flow-rate sensor 11 so that when the gas flow-rate switch is in its ON-state for a predetermined period of time, it is concluded that the accumulated evaporation quantity of a fuel evaporation gas sent from the fuel tank 7 into the canister 23 has reached or exceeded the predetermined value.

Third Embodiment

Figure 11:
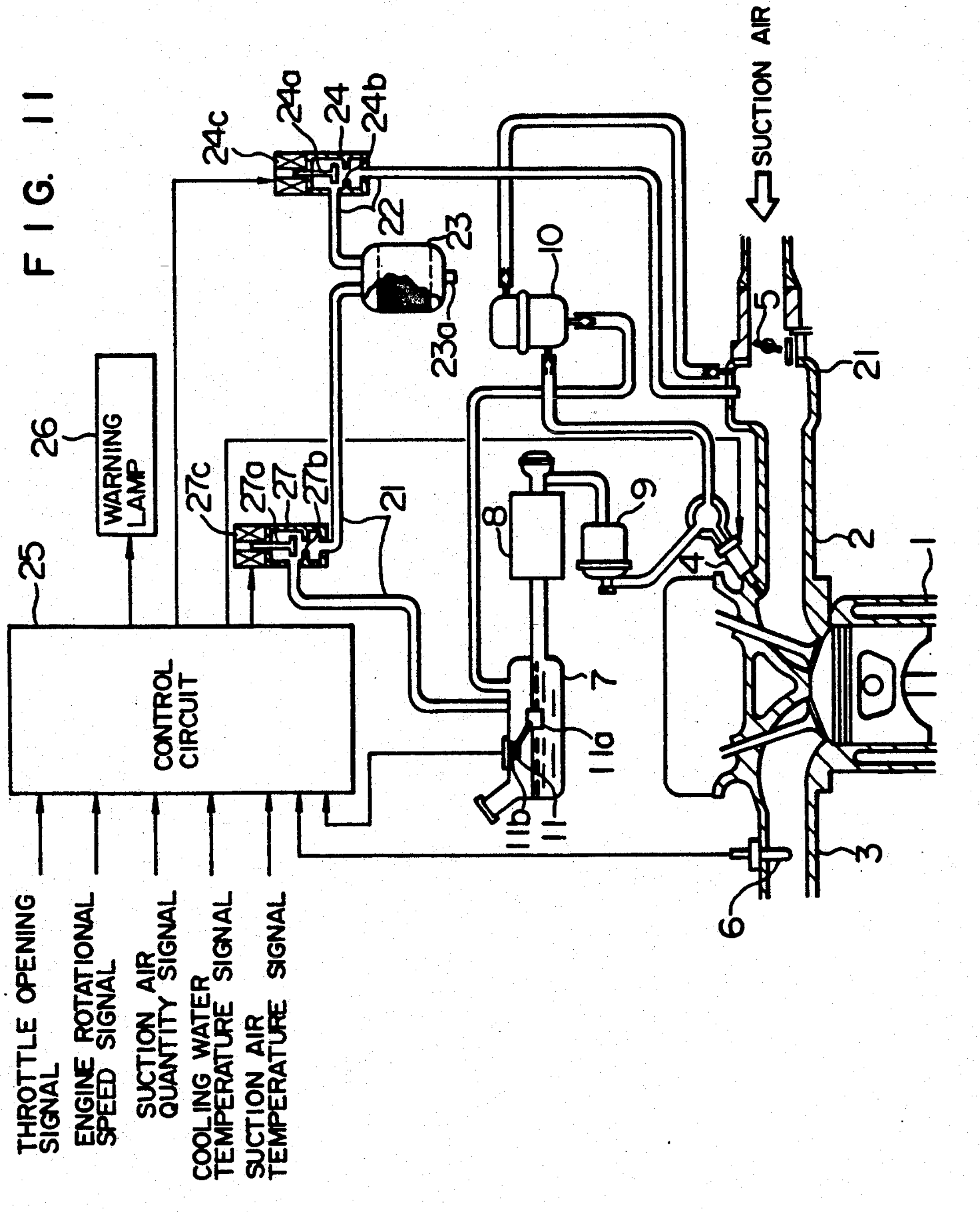
FIG. 11 is a diagram showing the vicinity of an engine in a third embodiment.
Figure 12:
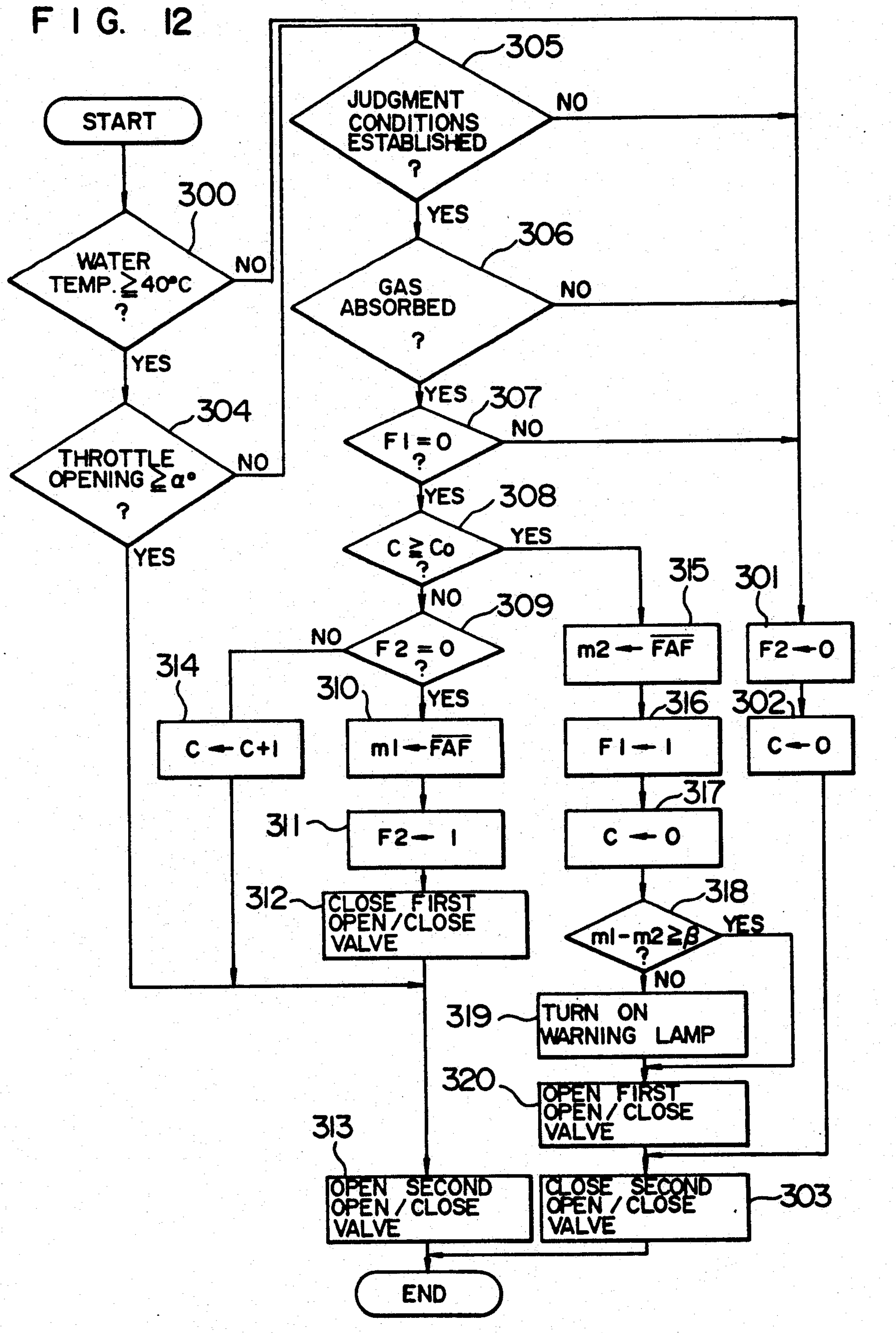
FIG. 12 is a flowchart for explaining the operation of the third embodiment.
Figure 13:
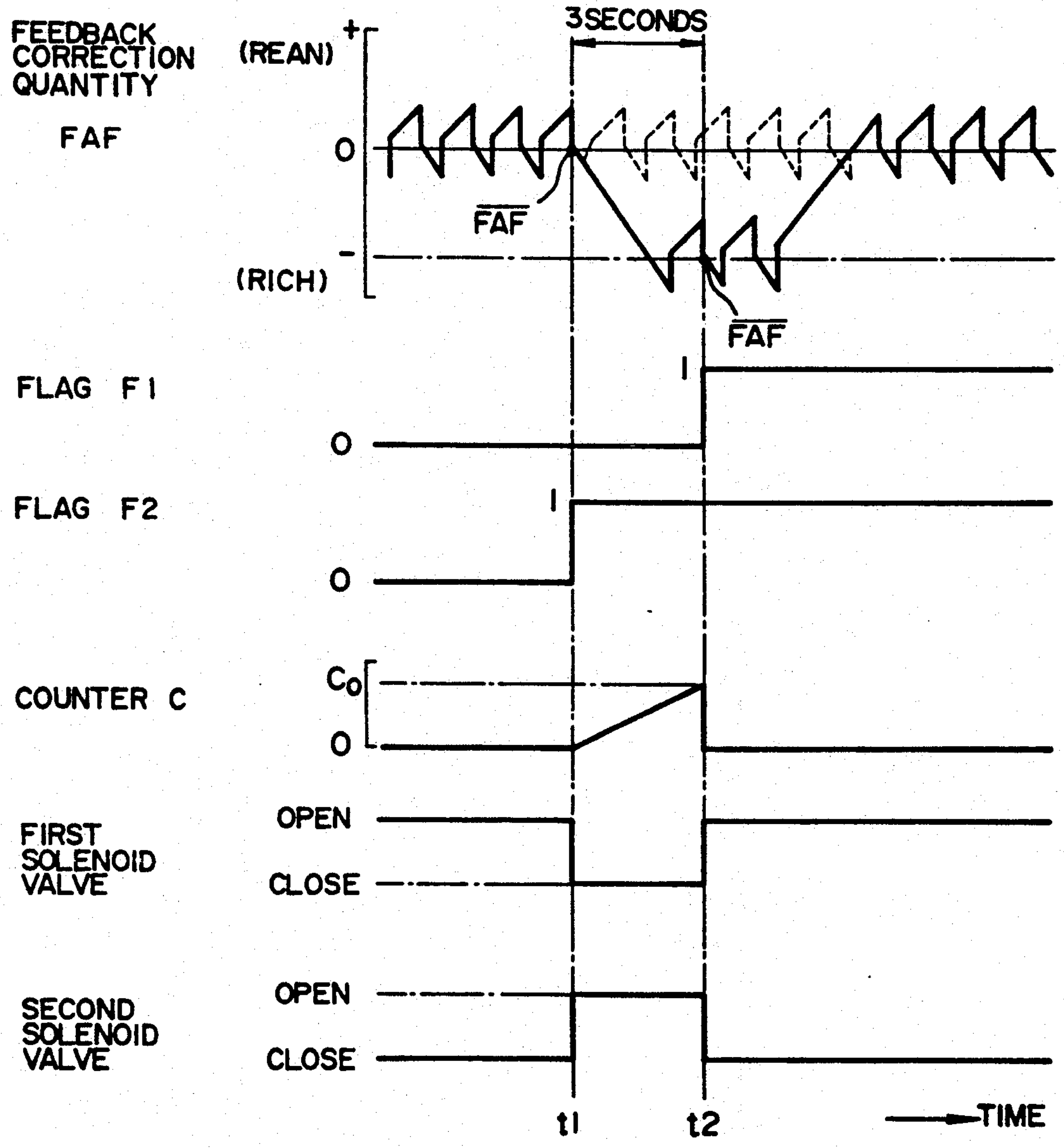
FIG. 13 is a time-chart showing various processing in the third embodiment.
Figure 14:
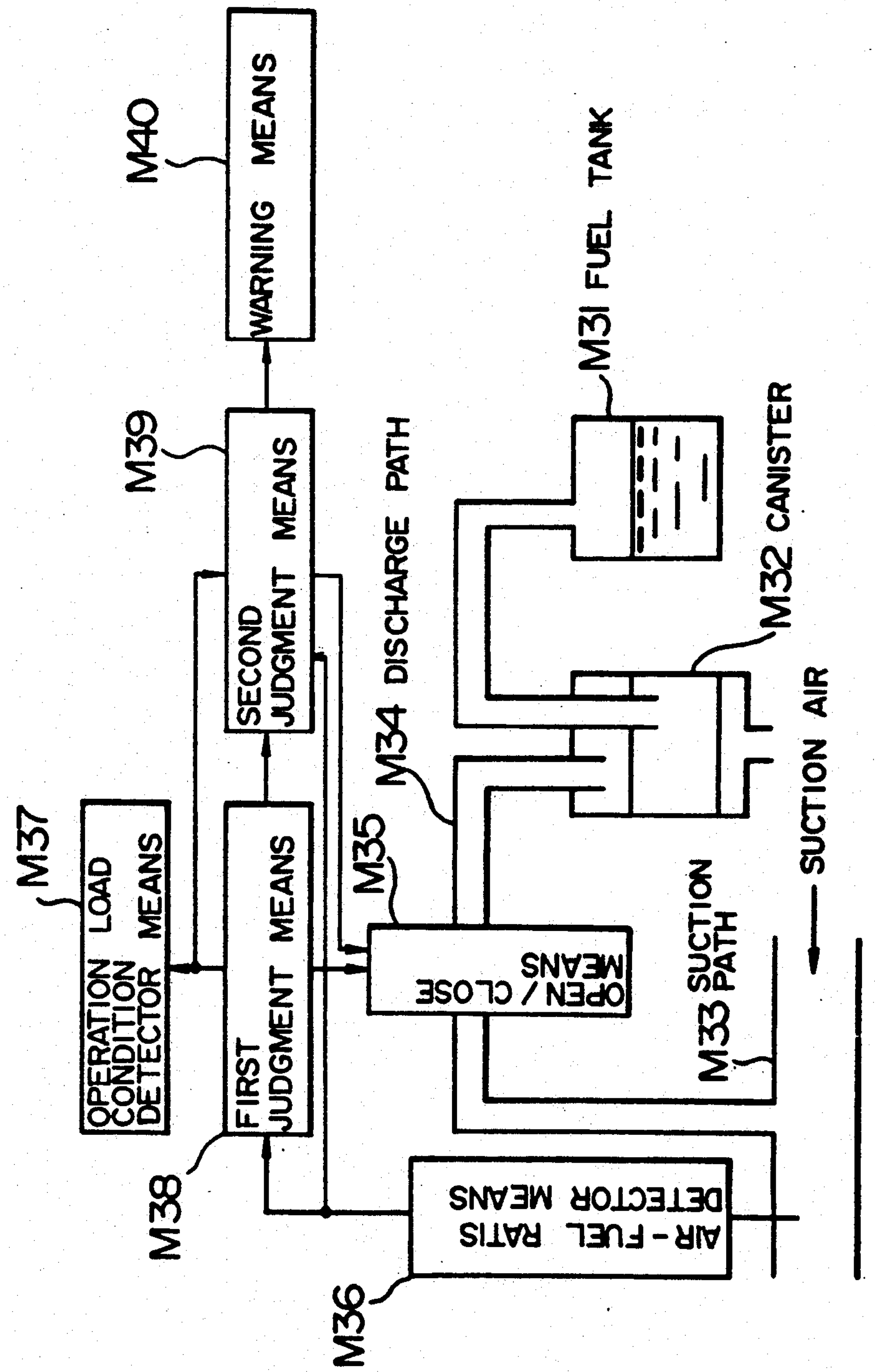
FIG. 14 is a diagram corresponding to the claim according to the fourth aspect of the present invention.

Referring to FIGS. 11 through 13, a third embodiment of the present invention will be described hereunder. The configuration of the self-diagnosis apparatus according to this embodiment is the same as those of the first and second embodiments of FIG. 3 except that a float-type fuel level sensor 11 is provided in a fuel tank 7 and a first solenoid valve 27 acting as a first opening/closing means is provided on the way of a communication pipe 21.

In this fuel level sensor 11, the level of a float 11a provided in the fuel tank 7 is detected by a potentiometer 11b so as to detect the quantity of fuel. In the first solenoid valve 27, although a valve body 27a is normally urged by a spring (not shown) in the direction to open a seat portion 27b, the valve body 27a closes the seat portion 27b when a coil portion 27c is excited. Therefore, the communication pipe 21 is opened upon unexcitation of the first solenoid valve 27 and closed upon excitation of the first solenoid valve 27. A second solenoid valve 24 provided on the way of a discharge pipe (the purge pipe) 22 so as to act as a second opening/closing means is the same as those of the first and second embodiments.

A control circuit 25 receives a signal produced from the fuel level sensor 11 and detects, on the basis of this signal, the fact that fuel has been supplied to the fuel tank 7. The control circuit 25 is connected to the first and second solenoid valves 27 and 24 so as to control the respective openings thereof.

Next, the operation of the control circuit 25 having such a configuration will be described.

FIG. 12 shows a control routine to be executed on the first and second solenoid valves 27 and 24 every predetermined time. FIG. 13 shows the operational timing of flags $F_1$ and $F_2$ and a counter C to be used for the routine. The counter C counts the time when the second solenoid valve 24 has been opened, the flag $F_1$ indicates the fact that the judgment processing is the first time after engine start, and the flag F2 indicates the fact that the judgment operation is being executed.

First, the control circuit 25 judges whether the temperature of engine cooling water is not lower than 40° C. or not in the step 300. If the judgment proves that the temperature is lower than 40° C., the control circuit 25 sets the flag $F_2$ to "0" in the step 301 and sets the counter C to "0" in the step 302. Then, the control circuit 25 closes the second solenoid valve 24 in the step 303.

If the judgment proves that the temperature of the engine cooling water is not lower than 40° C. in the step 300, on the contrary, the control circuit 25 judges whether the opening of throttle valve 5 is not smaller than a predetermined value o or not in the step 304. If the judgment proves that the opening is smaller than the predetermined value α, the control circuit 25 judges whether the judgment conditions have been established or not in the step 305. That is, when the temperature of the engine cooling water is not lower than 80° C., the throttle valve 5 is fully closed, the rotational speed of the engine is not lower than 100 rpm, and the air-fuel ratio is being feedback-controlled, it is concluded that the conditions have been established.

Next, the control circuit 25 judges whether a predetermined time has elapsed after supply of fuel so that a fuel evaporation gas has been sufficiently absorbed in the canister 23 or not in the step 306. If the judgment proves that the predetermined time has elapsed after the supply of fuel, the control circuit 25 judges whether the flag $F_1$ is "1" or not in the step 307. Since the flag $F_1$ has been set to "1" upon the engine start, the control circuit 25 judges whether the count value of the counter C is not smaller than a predetermined value $C_0$ or not. At this time, since C=0 has been established in the step 302, the control circuit 25 judges whether the flag $F_2$ is "0" or not in the step 309. At this time, since $F_2=0$ in the step 301, the control circuit 25 records the feedback correction factor $\overline{FAF}$ at that time in a storage area $m_1$.

Here, the feedback correction factor $\overline{FAF}$ is renewed every predetermined time as follows.

$$\overline{FAF} = \frac{63\overline{FAF} + FAF}{64}$$

The control circuit 25 sets the flag $F_2$ to "1" in the step 311, closes the first solenoid valve 27 in the step 312, and opens the second solenoid valve 24 in the step 313 (at the timing $t_1$ in FIG. 13). As a result, the absorbed fuel evaporation gas is led into the suction manifold 2 by means of the negative pressure in a suction manifold 2, together with fresh air sucked from an atmosphere opening hole 23 of the canister 23 in the condition where the fuel tank 7 and the canister 23 are not communicated with each other.

In the next routine processing, the control circuit 25 increases the count value of the counter C by "1" in the step 314 because $F_2=1$ in the step 309.

In the succeeding routine processing, if the judgment proves that the count value of the counter C has reached the predetermined value $C_0$ in the step 308, the control circuit 25 records the feedback correction factor $\overline{FAF}$ at that time in a storage area $M_2$. That is, the feedback correction factor $\overline{FAF}$ when the count value of the counter C has reached the predetermined value $C_0$ after opening of the second solenoid valve 24 (after three seconds) is recorded as shown in FIG. 13. Then, the control circuit 25 sets the flag $F_1$ to "0" in the step 316, and sets the counter C to "1" in the step 317.

Further, in the step 318, the control circuit 25 obtains a difference ($=m_1$-$m_2$) between the $\overline{FAF}$s obtained in the steps 310 and 315 respectively to thereby judge whether the difference is not smaller than a predetermined value β or not. If the judgment proves that the difference is smaller than the value β, the control circuit 25 concludes that there exists abnormality, and turns on a warning lamp 26 to thereby inform a rider of the abnormality in the step 319.

That is, if the system functions normally, a fuel evaporation gas absorbed by the activated carbon in the canister 23 is supplied into the suction manifold 2 when the second solenoid valve 24 in its closed state is opened so that the air-fuel ratio becomes rich. As a result, the judgment proves that the difference between the $\overline{FAF}$s becomes larger than the predetermined value β in the step 318. If the judgment proves that the difference between the $\overline{FAF}$s does not become larger than the predetermined value β in the step 318, on the contrary, it is concluded that the activated carbon in the canister 23 deteriorates or the canister 23 is damaged. Since the first solenoid valve 27 is in its closed state in this judgment, a fuel evaporation gas generated in the fuel tank 7 never reaches the canister 23 and has no influence on the judgment.

Thereafter, the control circuit 25 opens the first solenoid valve 27 in the step 320, and closes the second solenoid valve 24 in the step 303.

Thus, according to the self-diagnosis apparatus according to this embodiment, the first solenoid valve 27 (the first opening/closing means) is provided on the way of the communication pipe 21 so that in the condition where the control circuit 25 controls the first solenoid valve 27 so as to make the communication pipe 22 be in its closed state, the control circuit 25 controls the first solenoid valve 27 to successively open and close the discharge pipe 22 to thereby judge whether there exists abnormality or not on the basis of the fact that the difference between the air-fuel ratios (feedback correction factors FAF) obtained by an $O_2$ sensor 6 (the air-fuel ratio detector means) at that time is not smaller than the predetermined value β or not. Thus, the control circuit 25 turns on the warning lamp 26 to thereby produce a warning when it concludes that abnormality exists.

Therefore, when there occurs such an inconvenience that the activated carbon in the canister 23 deteriorates so that no fuel evaporation gas can be absorbed, or the like, it is possible to accurately detect the deterioration of the activated carbon in the condition where the first solenoid valve 24 is closed state so that no fuel evaporation gas from the fuel tank 7 has influence on the detection. Similarly to this, when the canister 23 is damaged, abnormality is detected because no change appears in the $\overline{FAF}$. Thus, it is possible to accurately detect abnormality such as deterioration of the activated carbon, damage of the canister 23, and so on.

Fourth Embodiment

Figure 15:
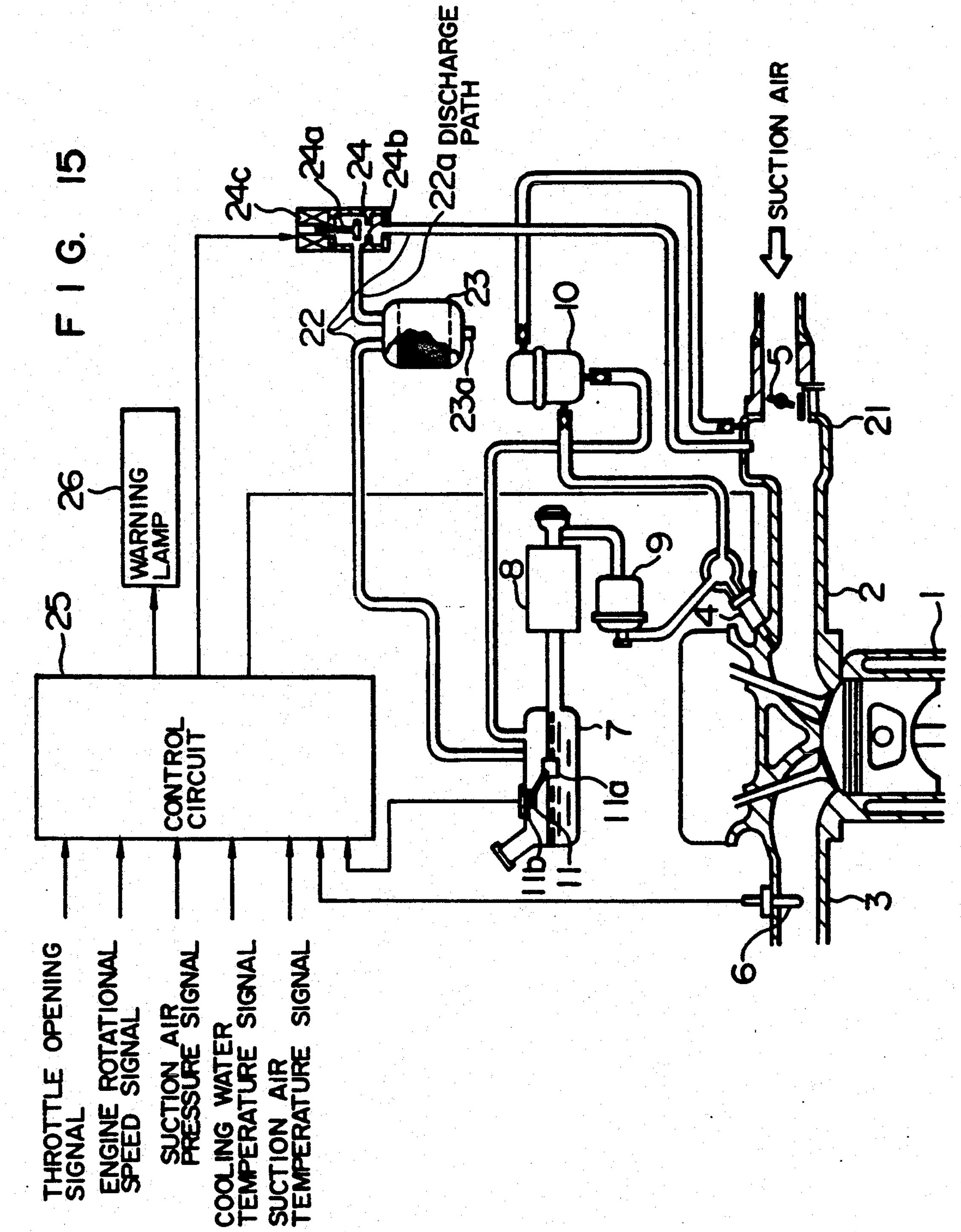
FIG. 15 is a diagram showing the vicinity of an engine in a fourth embodiment.

Referring to FIGS. 15 through 19, a fourth embodiment will be described hereunder. The self-diagnosis apparatus of this embodiment shown in FIG. 15 is similar to the third embodiment in the point that a float-type fuel level sensor 11 is provided in a fuel tank 7 and similar to the first and second embodiments in the point that the first electromagnetic switching valve 21 in the third embodiment is not provided on the way of a communication pipe 21.

A control circuit 25 including a microcomputer has first and second judgment means.

The control circuit 25 receives a signal from the fuel level sensor 11 to thereby detect the fuel supply into the fuel tank 7 on the basis of this signal. The control circuit 25 is further connected to a purge valve 24 so as to control the opening of the purge valve 24. A warning lamp 26 acting as a warning means is provided on an instrument panel of a vehicle and is connected to the control circuit 25.

Figure 16:
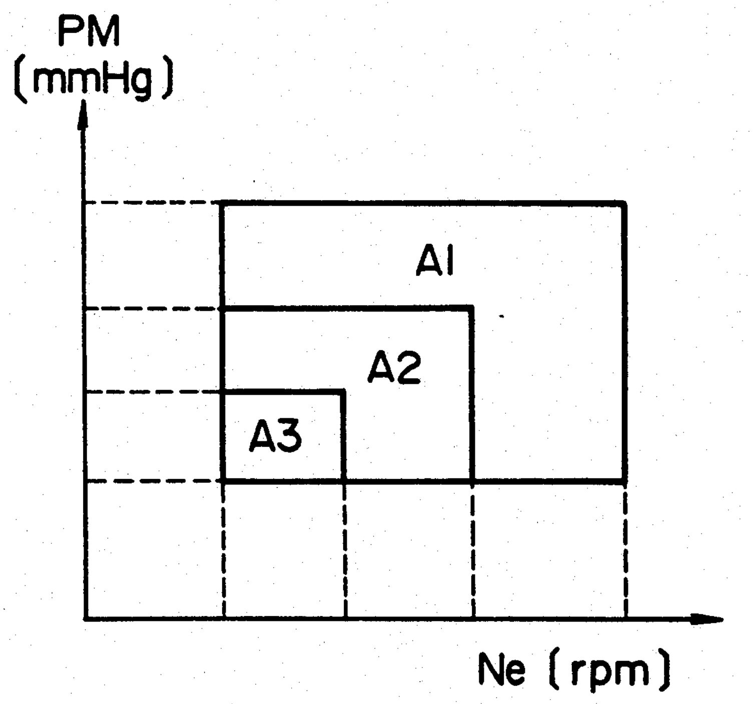
FIG. 16 is a map showing an operation load region of the engine.

Further, such a map as shown in FIG. 16 is prepared in the control circuit 25. In this, a high-load operation range A1, a middle-load operation range A2, and a low-load operation range A3 are set in advance in accordance with the relation between the engine rotational speed Ne and the suction pressure PM.

The operation of the control circuit 25 having such a configuration will be described hereunder.

Figure 17:
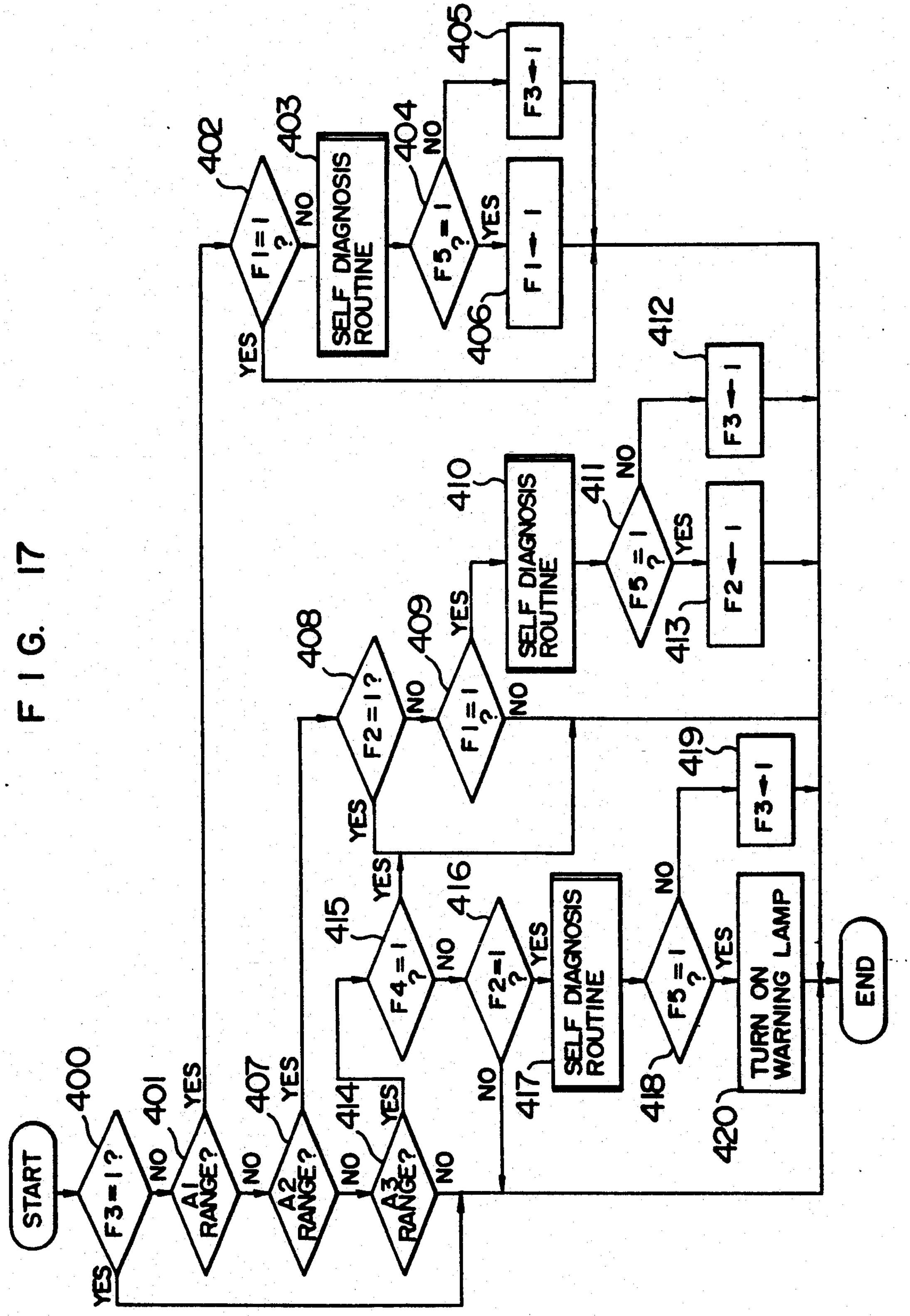
FIG. 17 is a flowchart for explaining the operation of the fourth embodiment.
Figure 18:
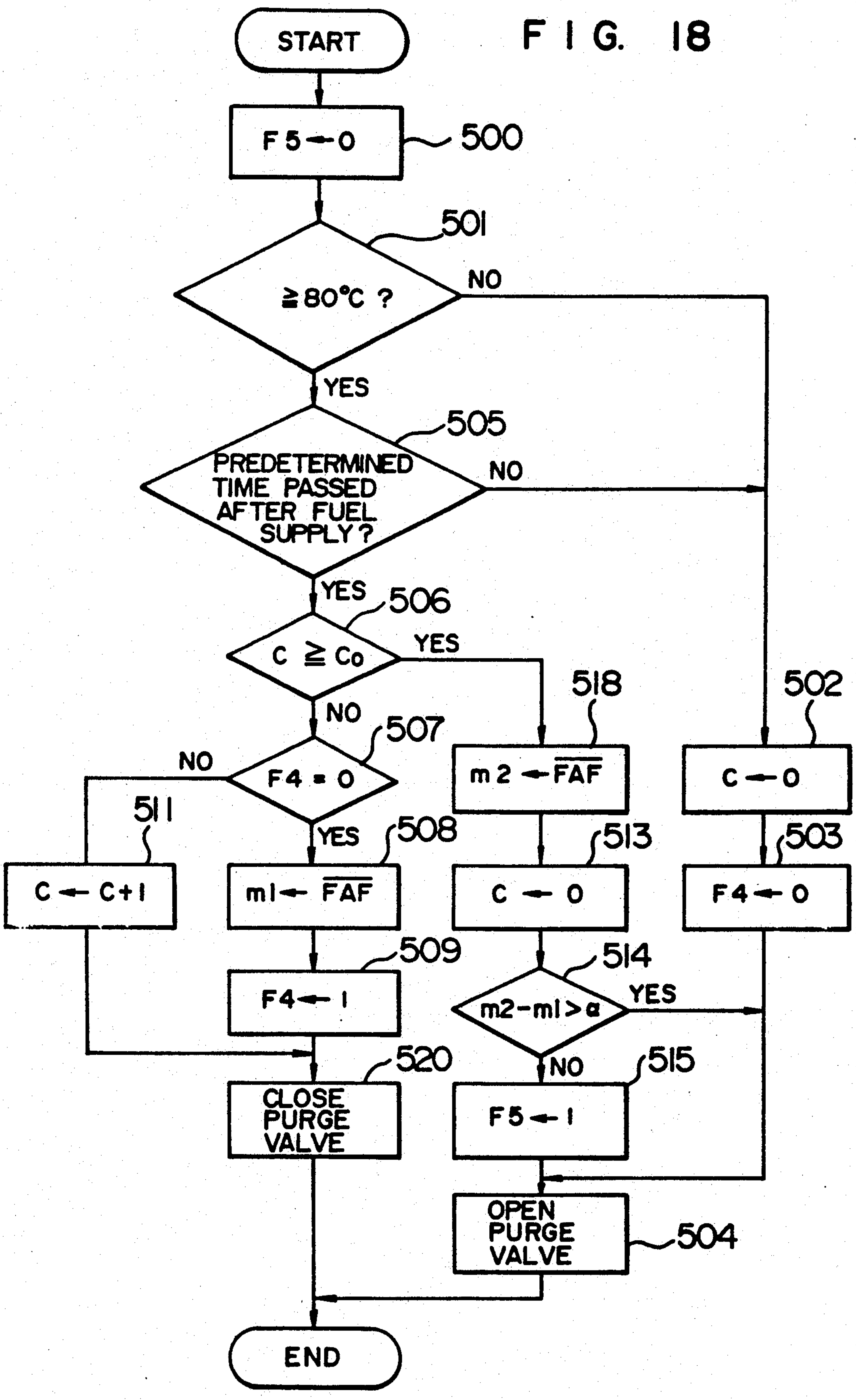
FIG. 18 is a flowchart for explaining the operation of the fourth embodiment.
Figure 19:
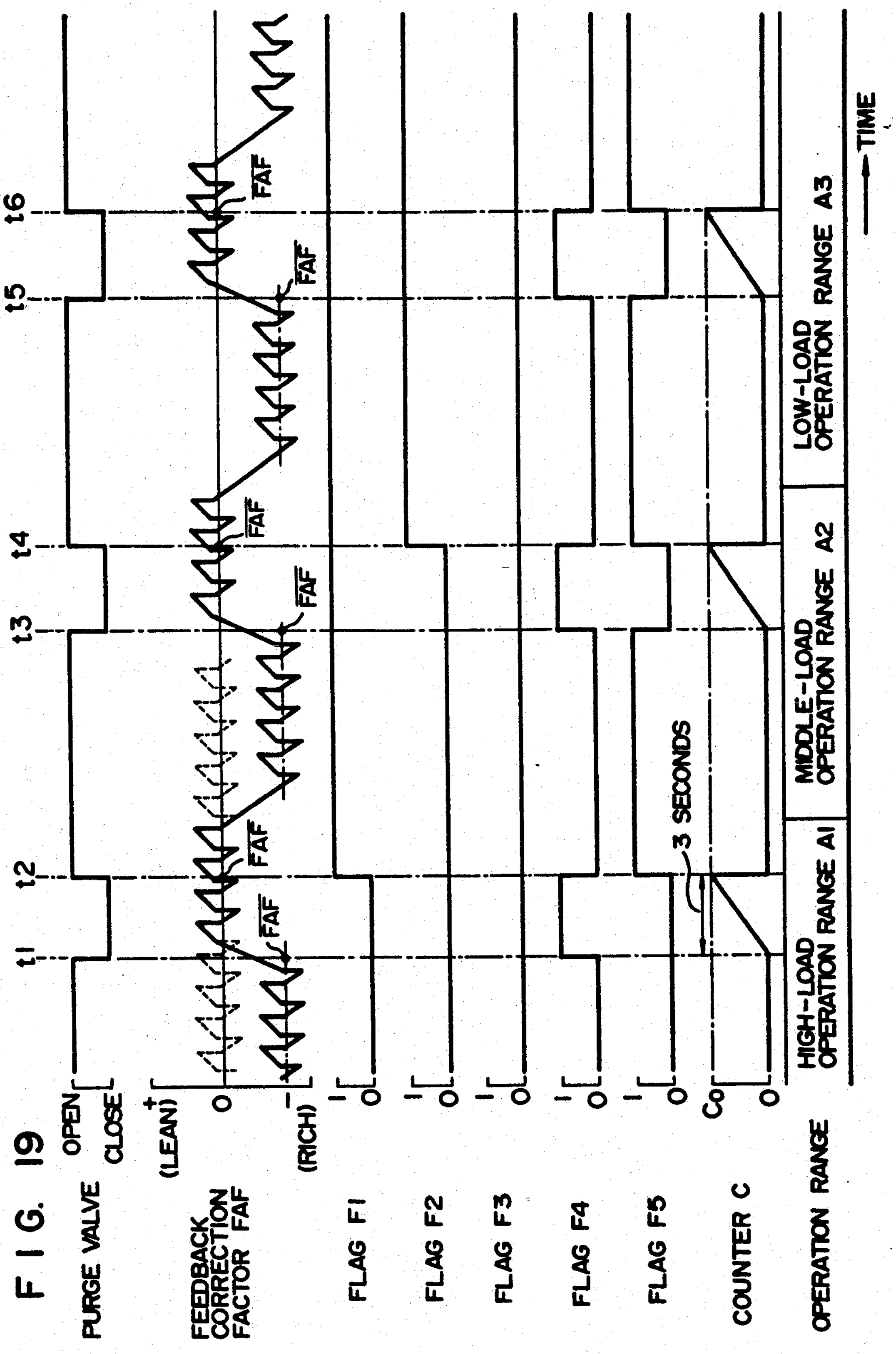
FIG. 19 is a time-chart showing various processing in the fourth embodiment.

FIG. 17 shows a flowchart for an abnormality judgment performed every predetermined time. FIG. 18 shows a self-diagnosis routine performed in the steps 03, 410, and 417 of FIG. 17. Further, FIG. 19 is a time chart showing the operation of flags F1–F5 and a counter C used in the flowchart of FIG. 18. The counter C is arranged to measure a time when the purge valve 24 is closed for abnormality diagnosis. Further, the flag F1 is a flag for abnormality checking in the high-load operation range A1, the flag F1 being set to "1" when abnormality exists. The flag F2 is a flag for abnormality checking in the middle-load operation range A2, the flag F2 being set to "1" when abnormality exists. The flag F3 is a normality-check flag which is set to "1" in a normal time. The flag F4 is a judgment-continuity check flag which is set to "1" while a judgment is continued. Further, the flag F5 is an abnormality flag which is set to "1" in an abnormal time.

Each of the flags F1–F5 and the counter C is initialized to "0" when an engine is started.

First, in FIG. 17, the control circuit 25 judges in the step 400 whether the normality-check flag F3 is "1" or not. When it is proved that the flag F3 is "0", the control circuit 25 judges in the step 401 whether the engine rotational speed Ne and the suction air pressure PM at that time are within the high-load operation range A1 in FIG. 16 or not. When it is proved that the engine rotational speed Ne and the suction air pressure PM are within the high-load operation range A1, the control circuit 25 judges in the step 402 whether the abnormality-check flag F1 is "1" or not. When it is proved that the flag A1 is "0", the control circuit 25 executes the self-diagnosis routine in the step 403.

In the self-diagnosis routine of FIG. 18, the control circuit 25 set the abnormality flag F5 to "0" in the step 500 and judges in the step 501 whether the temperature of engine cooling water is not lower than 80° C. or not. When the temperature is lower than 80° C., the control circuit 25 set the counter C to "0" in the step 502 and set the judgment-continuity flag F4 to "0" in the step 503. Thereafter, the control circuit 25 opens the purge valve 24 in the step 504.

When the temperature of the engine water is not lower than 80° C. in the step 501, the control circuit 25 makes confirmation in the step 505 as to whether a predetermined time has passed or not after the fuel supply. When it is confirmed that the predetermined time has passed, the control circuit 25 regards that a fuel evaporation gas is sufficiently absorbed into activated carbon of a canister 23. The control circuit 25 confirms in the step 506 that the count value of the counter C does not reach a predetermined value $C_0$ (in the processing of the step 502) and judges in the step 507 whether the judgment continuity flag F4 is "0" or not. Since the flag F4 has been set "0" in the step 503, the control circuit 25 records a feedback correction factor $\overline{FAF}$ at this time in a storage range $m_1$ in the step 508 (at the timing $t_1$ in FIG. 19).

Here, the feedback correction factor $\overline{FAF}$ is renewed every predetermined time as follows.

$$FAF = \frac{63FAF + FAF}{64}$$

The control circuit 25 sets the judgment continuity flag F4 to "1" in the step 509 and closes the purge valve 24 in the step 510.

In the succeeding routine, the control circuit 25 increases the count value of the counter C by "1" in the step 511 since the flag F4 has been set to "1" in the step 507, and then the operation is advanced to the step 520.

In the succeeding routine processing, when the count value of the counter C becomes the predetermined value $C_0$ in the step 506, that is, when three seconds have passed after the purge valve 24 is closed, the control circuit 25 records the feedback correction factor $\overline{FAF}$ at this time in a recording range $m_2$ in the step 512 (at the timing $t_2$ in FIG. 19). Then, the control circuit 25 25 set the count value of the counter C to "0" in the step 513.

The control circuit 25 obtains the difference between the $\overline{FAF}$s ($=m_2-m_1$) obtained in the steps 508 and 512 respectively, and judges whether the difference is not smaller than a predetermined value $\alpha$. When the difference is smaller than the predetermined value $\alpha$, the control circuit 25 concludes that abnormality exists and sets the abnormality flag F5 to "1" in the step 515. That is, in the case where the apparatus functions normally, if the purge valve 15 is opened, the fuel evaporation gas absorbed into the activated carbon in the canister 23 is supplied into a suction manifold 2 so that an air-fuel ratio becomes rich, while when the purge valve 15 is closed, the air-fuel ratio becomes lean, so that the difference between the $\overline{FAF}$s becomes larger than the predetermined value $\alpha$ in the step 514. However, the fact that the difference between the $\overline{FAF}$s does not become larger than the predetermined value $\alpha$ in the step 514 means there exists abnormality such as blocking or the like in the purge pipe 22.

In FIG. 17, the control circuit 25 judges in the step 404 whether the abnormality flag F5 is "1" or not. If it is proved that the flag F5 is "0", the control circuit 25 sets the normality-check flag F3 to "1" in the step 405, while when it is proved that the flag F5 is "1", the control circuit 25 sets the abnormality-check flag F1 to "1" in the step 406.

Thereafter, in the step 407, the control circuit 25 judges whether the relation between the engine rotational speed Ne and the suction air pressure PM at that time is within the middle-load operation range A2 of FIG. 16 or not. When the relation is within the middle-load operation range A2, the control circuit 25 judges in the step 408 whether the abnormality-check flag F2 is "1" or not. When it is proved that the flag F2 is "0", the control circuit 25 judges in the step 409 whether the abnormality-check flag F1 is "1" or not. When it is proved that the flag F1 is "1", the control circuit 25 concludes that there exists abnormality in the high-load operation range A1 and executes the self-diagnosis routine shown in FIG. 18 in the step 410 ($t_3$–$t_4$ in FIG. 19). Succeedingly, the control circuit 25 judges in the step 411 whether the abnormality flag F5 is "1" or not. When it is proved that the flag F5 is "0", the control circuit 25 sets the normality-check flag F3 to "1" in the step 412. When the F5 flag is "1", the control circuit 25 sets the abnormality-check flag F2 to "1" in the step 413.

The control circuit 25 further judges in the step 414 whether the relation between the engine rotational speed Ne and the suction air pressure PM at that time is within the low-load operation range A3 of FIG. 16 or not. When it is proved that the relation is within the low-load operation range A3, the control circuit 25 judges in the step 415 whether the judgment-continuity flag F4 is "1" or not. When it is proved that the flag F4 is "0", the control circuit 25 judges in the step 416 whether the abnormality-check flag F2 is "1" or not. When it is proved that the flag F2 is "1", the control circuit 25 concludes that abnormality exists in the middle-load operation range A2, and executes the self-diagnosis routine shown in FIG. 18 ($t_5$–$t_6$ in FIG. 19). Succeedingly, the control circuit 25 judges in the step 418 whether the abnormality flag F5 is "1" or not. When it is proved that the flag F5 is "0", the control circuit 25 sets the normality-check flag F3 to "1" in the step 419. If it is proved that the flag F5 is "1", on the contrary, the control circuit 25 turns on the warning lamp 26 in the step 420.

Thus, in the self-diagnosis apparatus of this embodiment, the control circuit 25 controls the purge valve 24 (the opening/closing means) so as to successively open and close the discharge path 22a in the high-load operation range A1 of the engine 1 detected by an engine rotational speed and a suction-pressure sensor so as to judge whether abnormality exists or not on the basis of a change in air-fuel ratio (the feedback correction factor $\overline{FAF}$) detected by the $O_2$ sensor 6 (the air fuel-ratio detector means) at that time. Further, after it is concluded that abnormality exists in the high-load operation range A1, the control circuit 25 controls the purge valve 24 in the middle-load operation range A2 so as to successively open and close the discharge path 22a to thereby judge whether abnormality exists or not on the basis of a change in air-fuel ratio detected by the $O_2$ sensor 6. After it is concluded that abnormality exists in the idle-load operation range A2, the control circuit 25 controls the purge valve 24 in the low-load operation range A3 so as to successively open and close the discharge path 22a to thereby judge whether abnormality exists or not on the basis of a change in air-fuel-ratio detected by the $O_2$ sensor at that time. When it is proved that abnormality exists also in the low-load operation range A3, the control circuit 25 turns on the warning lamp 26 to thereby produce a warning.

That is, although a judgment is made as to whether abnormality exists or not in the first operation load condition in which the engine 1 is operated with a high load, the accuracy of detection is low while the operation property of the engine 1 is little affected. After the existence of the abnormality is concluded in the high load condition, a judgment is made as to whether abnormality exists or not in a second operation load condition in which the load is lower than that in the first operation load condition. That is, the judgment of existence of the abnormality is made in the second operation load condition in which the accuracy in detection is higher than that in the first operation load condition. Accordingly, the accuracy in abnormality diagnosis can be improved while securing the operation property of the engine 1.

Although the engine rotational speed sensor and the suction pressure sensor are used as the operation load condition detector means in this embodiment, an air-quantity sensor may be used so as to detect the operation load condition on the basis of the quantity of sucked air.

Fifth Embodiment

Finally, referring to FIGS. 20 through 22, a fifth embodiment will be described. The self-diagnosis apparatus of the embodiment shown in FIG. 20 employs a gas flow-rate sensor 28 provided on the way of a communication pipe 15 as an evaporation gas condition detector means and has substantially the same configuration as that of the first and second embodiments except that a three-way solenoid valve 29 is inserted on the way of communication pipes 15 and 21 and that a purge valve 30 is provided on the way of a discharge pipe (a purge pipe) 22.

As the gas-flow sensor 28, for example, used is a sensor in which an orifice is provided on the way of a gas path so that a gas flow rate is measured on the basis of a difference in pressure between places in the front and rear of the orifice.

Figure 20:
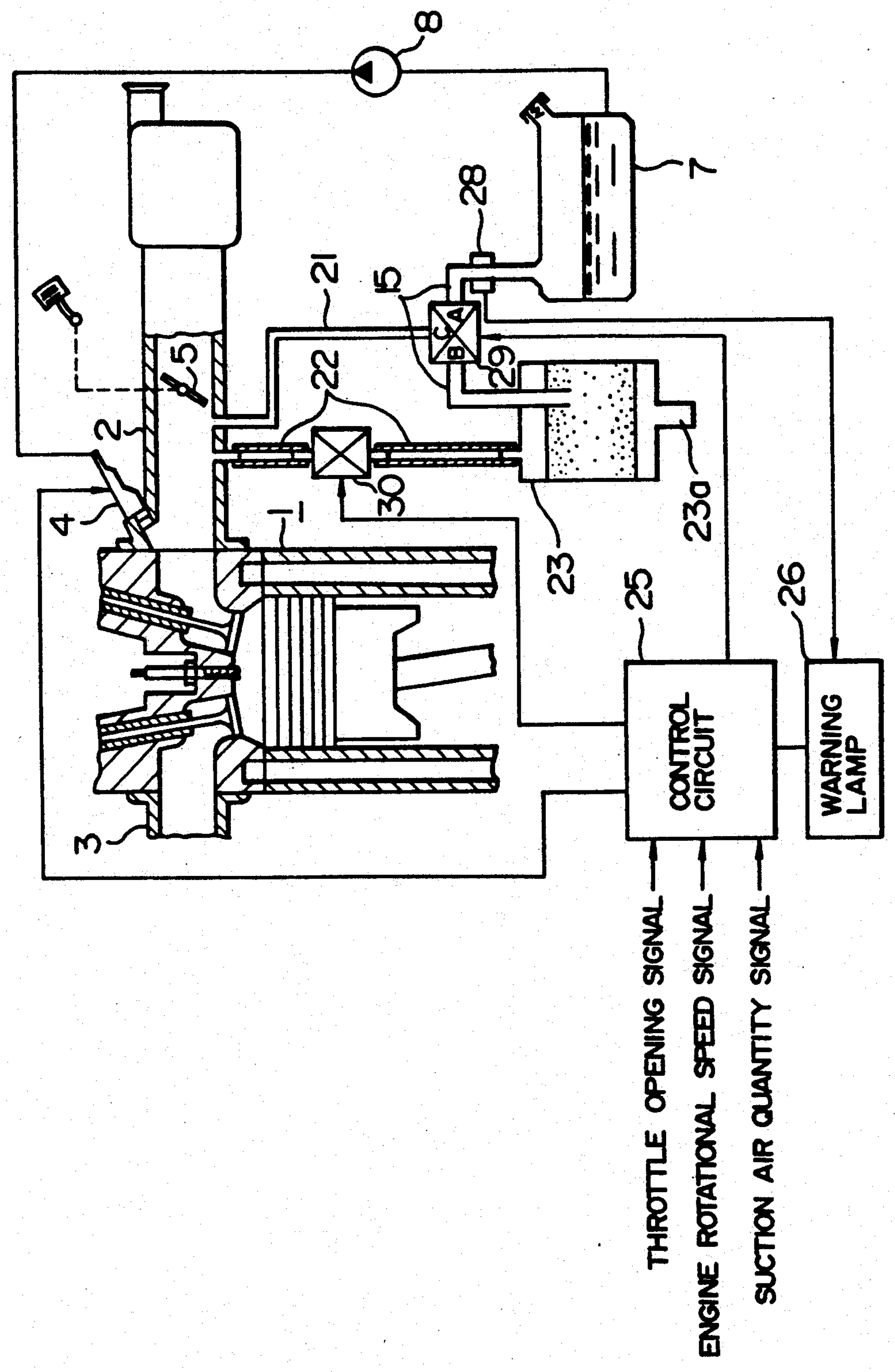
FIG. 20 is a diagram showing the vicinity of an engine in a forth embodiment.

As shown in FIG. 20, the three-way solenoid valve 29 has three connection portions, that is, a first connection portion A connected to the communication pipe 15 on the side of a fuel tank 7, a second connection portion B connected to the communication pipe 15 on the side of a canister 23, and a third connection portion C connected to a communication pipe 21 on the side of a suction manifold 2. The three-way solenoid valve 29 is arranged to change over the connection sate between a first condition in which the fuel tank 7 and the canister 23 are communicated with each other, and a second condition in which the fuel tank 7 and the suction manifold 2 are communicated with each other.

Further, the canister 23 and the suction manifold 2 are connected to each other through the purge pipe 22, and the purge valve 30 is provided on the way of the purge pipe 22. A solenoid valve may be used as the purge valve 30.

A control circuit 25 including a microcomputer and acting as a judgment means receives a throttle opening signal produced from a throttle sensor (not shown) an engine rotational speed signal, a suction air quantity signal produced by a suction air quantity sensor (not shown) for detecting a quantity of suction air, etc. Thus the control circuit 25 detects the throttle opening, the rotational speed of the engine, the quantity of suction air, and the like to thereby cause a fuel injection valve 4 to inject fuel at a predetermined injection timing.

The control circuit 25 further receives a detection signal of the gas flow-rate sensor 28 and controls the purge valve 30 and the three-way solenoid valve 29. Further, a warning lamp 26 as a warning means is provided on an instrument panel of a vehicle and is connected to the control circuit 25.

Next, the operation of the thus arranged control circuit 25 will be described.

First, normally, the control circuit 25 turns off the three-way solenoid valve 29 so as to establish the first condition (the condition in which the fuel tank 7 and the canister 23 are communicated with each other), and detects the flow rate of a fuel evaporation gas in the fuel tank 7 on the basis of the signal produced from the gas flow-rate sensor 28, thereby regulating the purge valve 30 to a predetermined opening under duty-factor control in accordance with the flow rate of the evaporation gas. That is, the quantity of the fuel evaporation gas which is absorbed in the activated carbon in the canister 23 and then fed into the suction manifold 2 is always kept constant.

Figure 21:
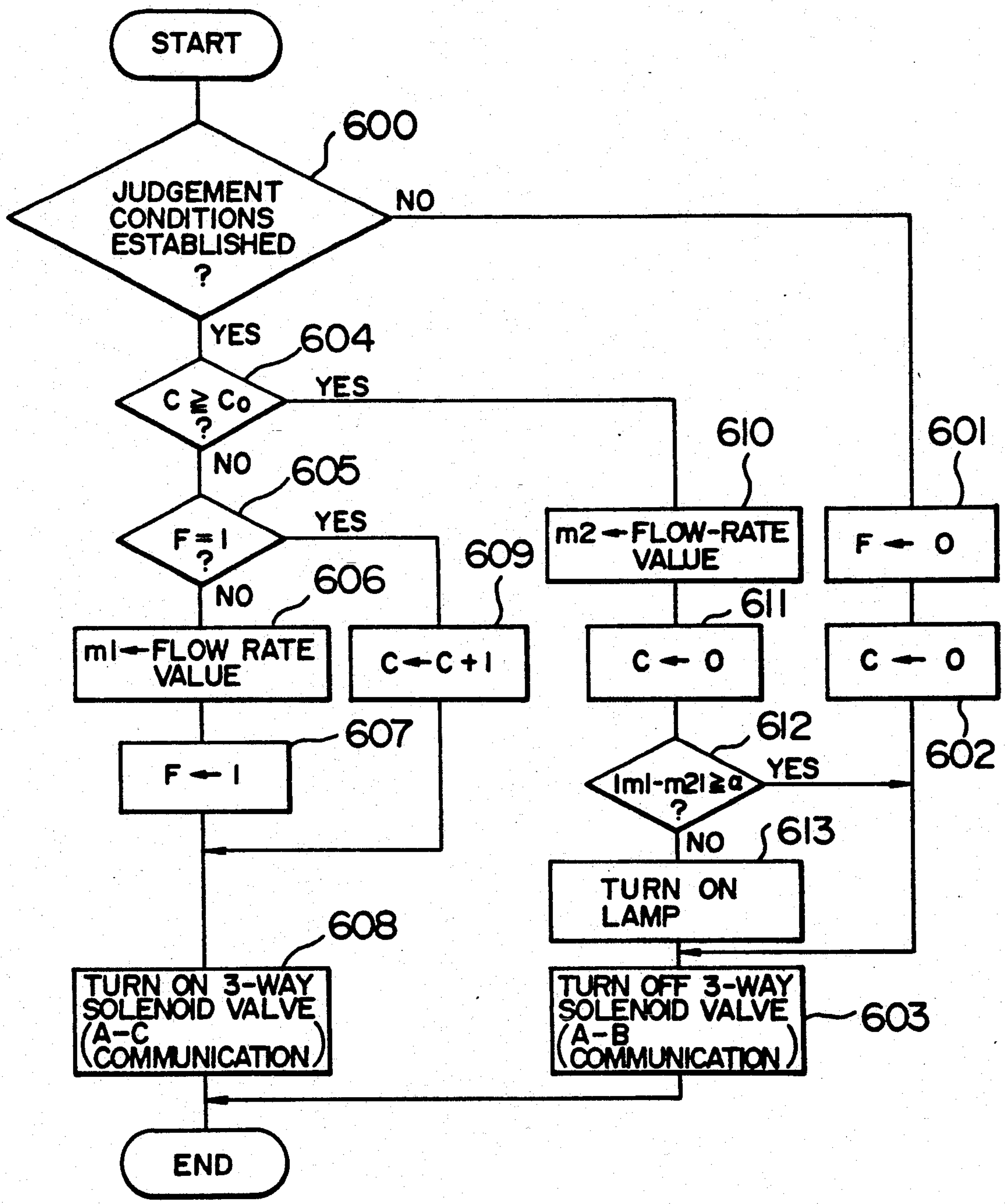
FIG. 21 is a flowchart for explaining the operation of the fifth embodiment.
Figure 22:
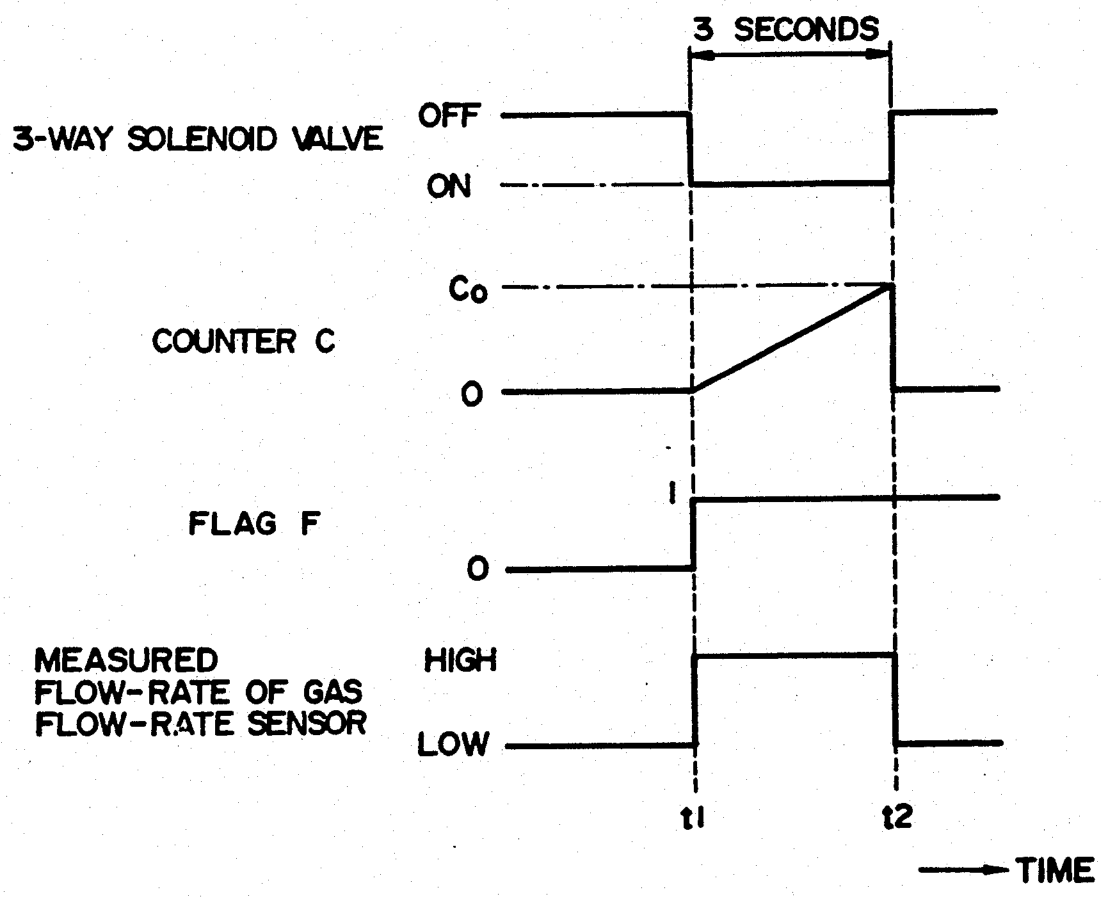
FIG. 22 is a time-chart showing various processing to be executed in the self-diagnosis operation of the fifth embodiment.

FIG. 21 shows an abnormality diagnosis routine of the gas flow-rate sensor 28 which is performed every predetermined time. FIG. 22 shows operational timings of a flag F and a counter C which are used in the routine. The flag F is set to "1" in a mode for abnormality diagnosis, and the counter C measures the time at which the three-way solenoid valve 29 is changed over in order to perform abnormality diagnosis.

The control circuit 25 judges in the step 600 whether the judging conditions have been realized or not. That is, it is judged whether a throttle valve 5 is fully closed or not. When it is proved that the throttle valve 5 is not fully closed, the control circuit 25 sets the flag F to "0" in the step 601 and sets the counter C to "0" in the step 602. Succeedingly, the control circuit 25 turns off the three-way solenoid valve 29 in the step 603 so as to establish the second condition in which the fuel tank 7 and the canister 23 are communicated with each other.

Further, when it is proved that the throttle valve 5 is fully closed in the step 600, the control circuit 25 judges in the step 604 whether the counter C has become a predetermined count value $C_0$. Since the count value of the counter C is "0" initially (through the processing of the step 602), the control circuit 25 judges in the step 605 whether the flag F is "1" or not. Since the flag F is not "1" initially (through the processing of the step 601), the control circuit 25 records a measured value of flow rate of the gas flow-rate sensor 28 in a storage range $m_1$ in the step 606. Succeedingly, the control circuit 25 sets the flag F to "1" in the step 607 and turns on the three-way solenoid valve 29 in the step 608 so as to establish the second condition in which the fuel tank 7 and the suction manifold 2 are communicated with each other (at the timing $t_1$ in FIG. 22).

Further, in the succeeding routine, since it is proved that the F is "1" in the step 605, the control circuit 25 increase the count value of the counter C by "1" in the step 609, and the operation is shifted to the step 608.

When it is proved that the count value of the counter C has reached the predetermined value $C_0$ in the step 604, that is, after the three-way solenoid valve 29 is kept on for three minutes, the control circuit 25 records the measured value of the flow rate of the gas flow-rate sensor 28 at that time in the storage range $m_2$ in the step 610. Succeedingly, the control circuit 25 set the counter C to "0" in the step 611, and judges in the step 612 whether the absolute value of the difference between the measured flow rate values stored in the storage ranges $m_1$ and m2 is not smaller than a predetermined value $\alpha$ or not. When it is proved that the absolute value of the difference between the measured flow rate values is not smaller than the predetermined value $\alpha$, the control circuit 25 concludes that the gas flow-rate sensor 28 is normal and operates normally.

That is, the fact that the flow rate measured by the gas flow-rate sensor 28 changes when the fuel tank 7 is made to communicate with the suction manifold 2 having a negative pressure from the condition in which the fuel tank 7 is communicated with the canister 23 so that the fuel tank 7 has an atmospheric pressure, means that the gas flow-rate sensor 28 normally functions. When it is proved that the gas flow-rate sensor 28 is normal, the control circuit 25 turns off the three-way solenoid valve 29 in the step 603 so as to establish the first condition in which the fuel tank 7 and the canister 23 are communicated with each other (at the timing $t_1$ in FIG. 22).

Further, when it is proved that the absolute value of the difference between the measured flow rate values is smaller than the predetermined value $\alpha$ in the step 612, the control circuit 25 turns on the warning lamp 26 in the step 613, and then the operation is shifted to the step 603.

Thus, in the self-diagnosis apparatus of this embodiment, the first, second, and third connection portions A, B, and C of the three-way solenoid valve 29 are connected to the fuel tank 7, the canister 23, and the suction manifold 2 respectively, and the control circuit 25 (the judgment means) changes over the state of the three-way solenoid valve 29 so as to selectively establish the first condition in which the fuel tank 7 and the canister 23 are communicated with each other or the second condition in which the fuel tank 7 and the suction manifold 2 are communicated with each other, so that the control circuit 25 judges whether abnormality exists or not in the gas flow-rate sensor 28 on the basis of a change in the flow rate of the fuel evaporation gas detected by the gas flow-rate sensor 28 (the evaporation gas condition detector means) at that time. When it is concluded that abnormality exists, the control circuit 25 generates a warning by use of the warning lamp 26 (the warning means). As a result, when the gas flow-rate sensor 28 for detecting the condition of the fuel evaporation gas is in an abnormal state, the abnormality can be surely detected.

As the evaporation gas condition detector means, for example, a gas pressure sensor attached on a ceiling portion of the fuel tank 7 may be used in place of the gas flow-rate sensor 28.

We claim:

1. In a fuel evaporation gas scattering preventing system comprising a canister communicating with a fuel tank and containing therein an absorption material adapted to absorb a fuel evaporation gas in said fuel tank, and a discharge path for making said canister communicate with a suction path of an internal combustion engine, whereby the fuel evaporation gas absorbed into said canister is sucked from said suction path of said internal combustion engine through said discharge path to thereby prevent the fuel evaporation gas from scattering, a self-diagnosis apparatus comprising:

opening/closing means provided in said discharge path;

air-fuel ratio detector means for detecting an air-fuel ratio of an air-fuel mixture fed to said internal combustion engine; and abnormality judgment means for controlling said opening/closing means to open/close said discharge path for judging that said gas scattering preventing system is abnormal when the magnitude of a change in said air-fuel ratio detected by said air-fuel ratio detector means upon opening/closing said discharge path is less than a predetermined value.

2. In a fuel evaporation gas scattering preventing system comprising a canister communicating with a fuel tank and containing therein an absorption material adapted to absorb a fuel evaporation gas in said fuel tank, and a discharge path for making said canister communication with a suction path of an internal combustion engine, whereby the fuel evaporation gas absorbed into said canister is sucked from said suction path of said internal combustion engine through said discharge path to thereby prevent the fuel evaporation gas from scattering, a self-diagnosis apparatus comprising:

opening/closing means provided in said discharge path;

air-fuel ratio detector means for detecting an air-fuel ratio of an air-fuel mixture fed to said internal combustion engine;

abnormality judgment means for controlling said opening/closing means to open/close said discharge path for judging whether said gas scattering preventing system is abnormal or not on the basis of a change in said air-fuel ratio detected by said air-fuel ratio detector means upon opening/closing said discharge path;

evaporation gas generating condition detector means for detecting the condition of generation of the fuel evaporation gas within said fuel tank; and judgment control means for actuating said judgment means to operate when generation of the fuel evaporation gas within said fuel tank is detected by said evaporation gas generating condition detector means.

3. A self-diagnosis apparatus according to claim 2, in which said evaporation gas generating condition detector means is constituted by a gas flow-rate sensor for detecting flowing of the fuel evaporation gas from said fuel tank into said canister.

4. A self-diagnosis apparatus according to claim 3, in which said gas flow-rate sensor includes: a casing having a communication hole communicating with the inside of said fuel tank and a connection portion connected to said canister; a valve body disposed in said casing closing said communication hole; a flexible support plate for supporting said valve body in said casing; a plurality of strain gauges fixed on said support plate for detecting a gas flow rate on the basis of a quantity of deflection of said support plate.

5. A self-diagnosis apparatus according to claim 2, further comprising: a three-way valve having a first connection portion connected to said fuel tank, a second connection portion connected to said canister and a third connection portion connected to said suction path; a judgment means for changing over the state of said three-way valve between a first state in which said fuel tank and said canister communicates with each other and a second state in which said fuel tank and said suction path communicate with each other to thereby make a judgment as to whether said evaporation gas generating condition detector means is abnormal or not on the basis of a change in the condition of the fuel evaporation gas detected by said evaporation gas generating condition detector means upon changing-over of said three-way valve.

6. In a fuel evaporation gas scattering preventing system comprising a canister communicating with a fuel tank and containing therein an absorption material adapted to absorb a fuel evaporation gas in said fuel tank, and a discharge path for making said canister communication with a suction path of an internal combustion engine, whereby the fuel evaporation gas absorbed into said canister is sucked from said suction path of said internal combustion engine through said discharge path to thereby prevent the fuel evaporation gas from scattering, a self-diagnosis apparatus comprising:

opening/closing means provided in said discharge path;

air-fuel ratio detector means for detecting an air-fuel ratio of an air-fuel mixture fed to said internal combustion engine;

abnormality judgment means for controlling said opening/closing means to open/close said discharge path for judging whether said gas scattering preventing system is abnormal or not on the basis of a change in said air-fuel ratio detected by said air-fuel ratio detector means upon opening/closing said discharge path;

idling condition judgment means for judging whether said internal combustion engine is in an idling condition or not; and judgment control means for actuating said abnormality judgment means when said idling condition judgment means proves that said internal combustion engine is in an idling condition.

7. In a fuel evaporation gas scattering preventing system comprising a canister communicating with a fuel tank and containing therein an absorption material adapted to absorb a fuel evaporation gas in said fuel tank, and a discharge path for making said canister communication with a suction path of an internal combustion engine, whereby the fuel evaporation gas absorbed into said canister is sucked from said suction path of said internal combustion engine through said discharge path to thereby prevent the fuel evaporation gas from scattering, a self-diagnosis apparatus comprising:

opening/closing means provided in said discharge path;

air-fuel ratio detector means for detecting an air-fuel ratio of an air-fuel mixture fed to said internal combustion engine;

abnormality judgment means for controlling said opening/closing means to open/close said discharge path to thereby make a judgment as to whether said gas scattering preventing system is abnormal or not on the basis of a change in said air-fuel ratio detected by said air-fuel ratio detector means upon opening/closing said discharge path;

air-fuel ratio feedback judgment means for judging whether air-fuel ratio feedback control by said air-fuel ratio feedback detector is being executed or not; and judgment control means for actuating said abnormality judgment means when said air-fuel ratio feedback judgment means proves that air-fuel ratio feedback is being executed and said idling condition judgment means proves that said internal combustion engine is in an idling condition.

* * * * *